United States Patent
Whelan et al.

(10) Patent No.: US 11,635,874 B2
(45) Date of Patent: Apr. 25, 2023

(54) PEN-SPECIFIC USER INTERFACE CONTROLS

(71) Applicant: Microsoft Technology Licensing, LLC, Redmond, WA (US)

(72) Inventors: Sean Shiang-Ning Whelan, Seattle, WA (US); Scott David Schenone, Seattle, WA (US); Young Soo Kim, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/346,162

(22) Filed: Jun. 11, 2021

(65) Prior Publication Data

US 2022/0397988 A1 Dec. 15, 2022

(51) Int. Cl.
*G06F 3/0482* (2013.01)
*G06F 3/0354* (2013.01)
(Continued)

(52) U.S. Cl.
CPC ........ *G06F 3/0482* (2013.01); *G06F 3/03545* (2013.01); *G06F 3/04845* (2013.01);
(Continued)

(58) Field of Classification Search
CPC ............... G06F 3/0482; G06F 3/03545; G06F 3/04845; G06F 3/04886; G06F 3/1446;
(Continued)

(56) References Cited

U.S. PATENT DOCUMENTS

| 5,657,049 A | * | 8/1997 | Ludolph | ............... G06F 3/0481 715/835 |
| 5,664,128 A | * | 9/1997 | Bauer | ................... G06F 3/0483 715/708 |

(Continued)

FOREIGN PATENT DOCUMENTS

| EP | 2530561 A2 | 12/2012 |
| EP | 2720140 A1 | 4/2014 |
| EP | 2743819 A2 | 6/2014 |

OTHER PUBLICATIONS

Dan Gookin, "Basics of Your Samsung Galaxy Tab's S Pen", published online on Jan. 13, 2014 to https://www.dummies.com/consumer-electronics/tablets/samsung-galaxy-tab/basics-of-your-samsung-galaxy-tabs-s-pen, retrieved Oct. 23, 2021 (Year: 2014).*

(Continued)

*Primary Examiner* — Shourjo Dasgupta
(74) *Attorney, Agent, or Firm* — Weaver IP L.L.C.

(57) ABSTRACT

Methods for pen-specific user interface controls are performed by systems and devices. Users activate pen-specific menus at user devices by activating controls of a touch pen such as a tail button. A communication is received by a device, from a touch pen, that indicates an activation control of the touch pen has been physically activated. The user device selects a touch pen menu that includes selectable menu options for respective launching of separate pen applications from among available menus based at least on the received communication. The device determines menu presentation information specifying a location within a user interface (UI) from a state of the UI at a time associated with the communication. The touch pen menu is displayed via the UI according to the menu presentation information. A detection for selection of a selectable menu option causes the device to launch a pen application associated therewith.

20 Claims, 12 Drawing Sheets

(51) Int. Cl.
  *G06F 3/04845* (2022.01)
  *G06F 9/451* (2018.01)
  *G06F 16/2455* (2019.01)
  *G06F 3/14* (2006.01)
  *G06F 3/04886* (2022.01)

(52) U.S. Cl.
  CPC ........ *G06F 3/04886* (2013.01); *G06F 3/1446* (2013.01); *G06F 9/451* (2018.02); *G06F 16/2455* (2019.01); *G06F 2203/04803* (2013.01); *G06F 2203/04807* (2013.01)

(58) Field of Classification Search
  CPC .................. G06F 9/451; G06F 16/2455; G06F 2203/04803; G06F 2203/04807
  See application file for complete search history.

(56) References Cited

U.S. PATENT DOCUMENTS

| | | | | |
|---|---|---|---|---|
| 6,175,364 | B1* | 1/2001 | Wong | G06F 9/451 345/589 |
| 8,799,813 | B2* | 8/2014 | Jobs | G06F 3/0481 715/779 |
| 11,068,158 | B2* | 7/2021 | Yuk | G06F 3/04883 |
| 2003/0107607 | A1 | 6/2003 | Nguyen | |
| 2004/0021647 | A1* | 2/2004 | Iwema | G06F 3/0488 345/179 |
| 2005/0028110 | A1* | 2/2005 | Vienneau | G06F 3/04845 715/810 |
| 2006/0136840 | A1* | 6/2006 | Keely, Jr. | G06F 3/04883 715/808 |
| 2008/0238887 | A1* | 10/2008 | Love | G06F 3/03545 345/179 |
| 2010/0287530 | A1* | 11/2010 | MacLean | G06F 11/3664 717/105 |
| 2013/0086471 | A1* | 4/2013 | Moore | G06F 40/106 715/269 |
| 2014/0096069 | A1* | 4/2014 | Boblett | H04S 7/303 715/783 |
| 2014/0160045 | A1 | 6/2014 | Park et al. | |
| 2014/0253463 | A1* | 9/2014 | Hicks | G06F 3/046 345/173 |
| 2014/0280180 | A1* | 9/2014 | Edecker | G06F 16/285 707/769 |
| 2014/0298244 | A1* | 10/2014 | Kim | G06F 3/04883 715/780 |
| 2014/0359473 | A1* | 12/2014 | Tang | H04M 1/72454 715/746 |
| 2015/0067594 | A1* | 3/2015 | Choi | H04M 1/724 715/808 |
| 2015/0103014 | A1 | 4/2015 | Kim et al. | |
| 2015/0185980 | A1* | 7/2015 | An | G06F 3/04817 715/803 |
| 2015/0347001 | A1* | 12/2015 | Motoi | G06F 3/041 345/173 |
| 2016/0140387 | A1* | 5/2016 | Sugiura | G06V 30/1423 382/189 |
| 2016/0154580 | A1* | 6/2016 | Hirabayashi | G06F 3/0482 715/268 |
| 2016/0378217 | A1* | 12/2016 | Kim | G06F 3/04847 345/173 |
| 2018/0052531 | A1* | 2/2018 | Peretz | G06F 3/016 |
| 2019/0339822 | A1* | 11/2019 | Devine | G06V 40/16 |
| 2020/0064933 | A1 | 2/2020 | Zhang et al. | |
| 2020/0209992 | A1* | 7/2020 | Kwak | H04W 4/40 |
| 2020/0312001 | A1 | 10/2020 | Chang et al. | |

OTHER PUBLICATIONS

"Change the S Pen settings on your Galaxy Note", published on Aug. 20, 2020 to https://www.samsung.com/us/support/answer/ANS00077673, retrieved Oct. 23, 2021 (Year: 2020).*

Oliver Cragg and Dhruv Bhutani, "The evolution of the Samsung Galaxy Note S Pen", published on Mar. 12, 2021 to https://www.androidauthority.com/samsung-galaxy-note-s-pen-evolution-892596, retrieved Oct. 23, 2021 (Year: 2021).*

"Looking Back at the S Pen's History of Innovation", published on Aug. 5, 2020 to https://news.samsung.com/global/since-2011-looking-back-at-the-s-pens-history-of-innovation, retrieved Oct. 23, 2021 (Year: 2011).*

Cherlynn Low, "A cheat sheet for the new Galaxy Note 9 S Pen", published on Aug. 24, 2018 to https://www.engadget.com/2018-08-24-samsung-galaxy-note-9-s-pen-how-to-tips-tricks.html, retrieved Oct. 23, 2021 (Year: 2018).*

Devon Delfino, "10 ways to use the S Pen on a Samsung Galaxy device", published on Apr. 14, 2021 to https://www.businessinsider.com/how-to-use-s-pen-on-samsung-galaxy, retrieved Oct. 23, 2021 (Year: 2021).*

Mohit Bharti, "How to use, manage, and fix issues of the S Pen's Air command", published on Nov. 6, 2020 to https://www.sammyfans.com/2020/11/06/how-to-use-manage-and-fix-issues-of-the-s-pens-air-command, retrieved Oct. 23, 2021 (Year: 2020).*

Chris Hoffman, "How to Use (or Disable) the Windows Ink Workspace on Windows 10", published on Jul. 5, 2017 to https://www.howtogeek.com/265056/how-to-use-or-disable-the-windows-ink-workspace-on-windows-10, retrieved Jun. 23, 2022 (Year: 2017).*

"Change the S Pen Settings on your Galaxy Device", published on Oct. 6, 2017 to https://www.samsung.com/us/support/answer/ANS00077673, retrieved Jun. 23, 2022 (Year: 2017).*

Ben J. Edwards, "How to Enable or Disable Windows 10's Full-Screen Start Menu", published on Oct. 16, 2020 to https://www.howtogeek.com/694660/how-to-enable-or-disable-windows-10s-full-screen-start-menu, retrieved Jun. 23, 2022 (Year: 2020).*

"Pen & Windows Ink, how does the handedness setting affect pen input?", published on Dec. 7, 2016 to https://superuser.com/questions/1153746/pen-windows-ink-how-does-the-handedness-setting-affect-pen-input, retrieved Jun. 23, 2022 (Year: 2016).*

"Surface or Windows Tablet settings for left-handed users", published on Dec. 30, 2018 to https://www.thewindowsclub.com/windows-surface-settings-left-handed, retrieved Jun. 23, 2022 (Year: 2018).*

"Use the Pen Menu in Windows", published on Aug. 2, 2016 to https://support.microsoft.com/en-us/windows/use-the-pen-menu-in-windows-701b15d4-2dcc-1aec-cf2b-370c56e8baf4, retrieved Dec. 13, 2022. (Year: 2016).*

"Review: Surface Go—part 5: The Pen on the Go" published on Dec. 13, 2018 to https://allaboutwindowsphone.com, retrieved Dec. 13, 2022. (Year: 2018).*

"Galaxy Note 10 S Pen: All the Features at your Command", Retrieved from: https://www.sammobile.com/2019/09/18/galaxy-note-10-s-pen-all-the-features-at-your-command/, Sep. 19, 2019, 16 Pages.

"What is the S Pen and How do I Use it?", Retrieved from: https://web.archive.org/web/20200808235858/https:/www.samsung.com/uk/support/mobile-devices/what-is-the-s-pen-and-how-do-i-use-it/, Aug. 8, 2020, 4 Pages.

Brink, Shawn, "How to Change Pen Shortcut Button Settings in Windows 10", Retrieved from: https://www.tenforums.com/tutorials/111129-change-pen-shortcut-button-settings-windows-10-a.html, Dec. 21, 2019, 8 Pages.

"International Search Report and Written Opinion Issued in PCT Application No. PCT/US22/031499", dated Sep. 23, 2022, 15 Pages.

* cited by examiner

PEN-SPECIFIC USER INTERFACE CONTROLS

BACKGROUND

User interfaces such as touch interfaces allow users to interact with displayed content via touches of fingers, a stylus, a pen, etc. For example, a user may tap a touch interface on a display to select a menu option, launch an application, or interact with an application. Likewise, buttons on a stylus or pen can provide commands to user devices having user interfaces to display general menus and for interactions within executing stylus- or pen-specific applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for pen-specific user interface controls are performed by systems, devices, and apparatuses. Users activate pen-specific menus at user devices by activating controls of a touch pen such as a tail button. A communication is received by a device, from a touch pen, that indicates an activation control of the touch pen has been activated. The user device selects a touch pen menu that includes selectable menu options for respective launching of separate pen applications from among available menus based at least on the received communication. The device determines menu presentation information specifying a location within a user interface (UI) from a state of the UI at a time associated with the communication. The touch pen menu is displayed via the UI according to the menu presentation information. A detection for selection of a selectable menu option causes the device to launch a pen application associated therewith.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based at least on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 1A shows a block diagram of a system for pen-specific user interface controls, according to an example embodiment.

FIGS. 1B and 1C each show diagrams of a touch pen for pen-specific user interface controls, according to example embodiments.

FIGS. 4A, 4B, 4C, 4D, and 4E show diagrams of user interfaces with pen menus for pen-specific user interface controls, in accordance with example embodiments.

FIGS. 5A, 5B, 5C, and 5D show diagrams of user interfaces with pen menus for pen-specific user interface controls, in accordance with example embodiments.

Figure 6A:
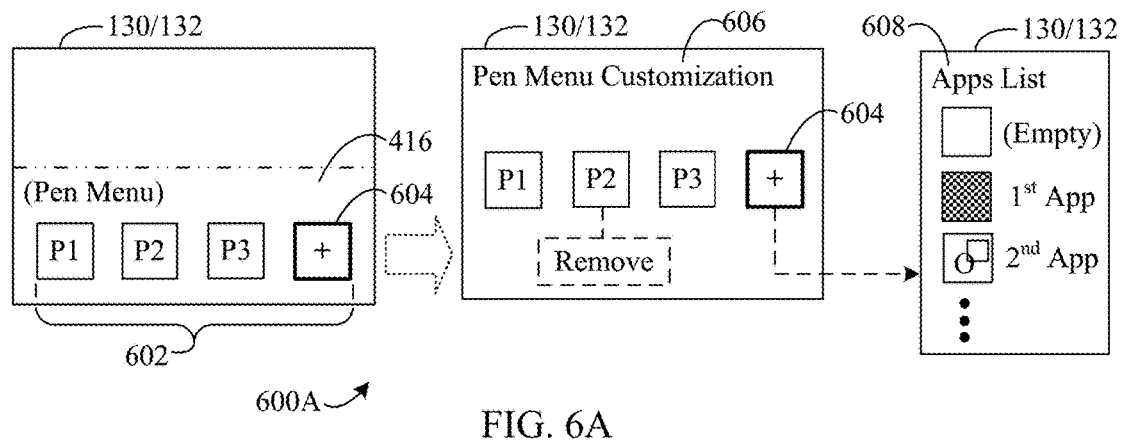
Figure 6B:
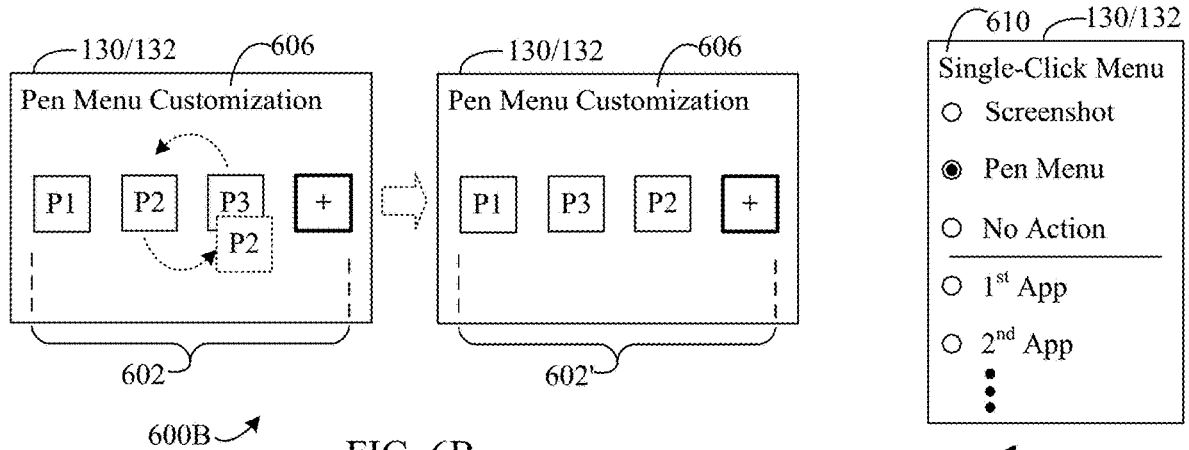
Figure 6C:
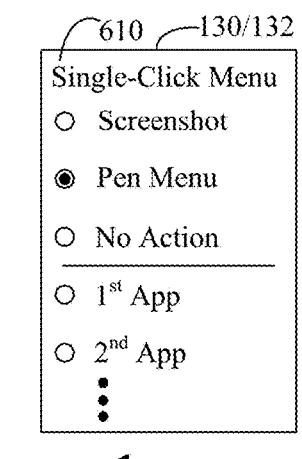

FIGS. 6A, 6B, and 6C show diagrams of user interfaces with pen menus for pen-specific user interface controls, in accordance with example embodiments.

Figure 7:
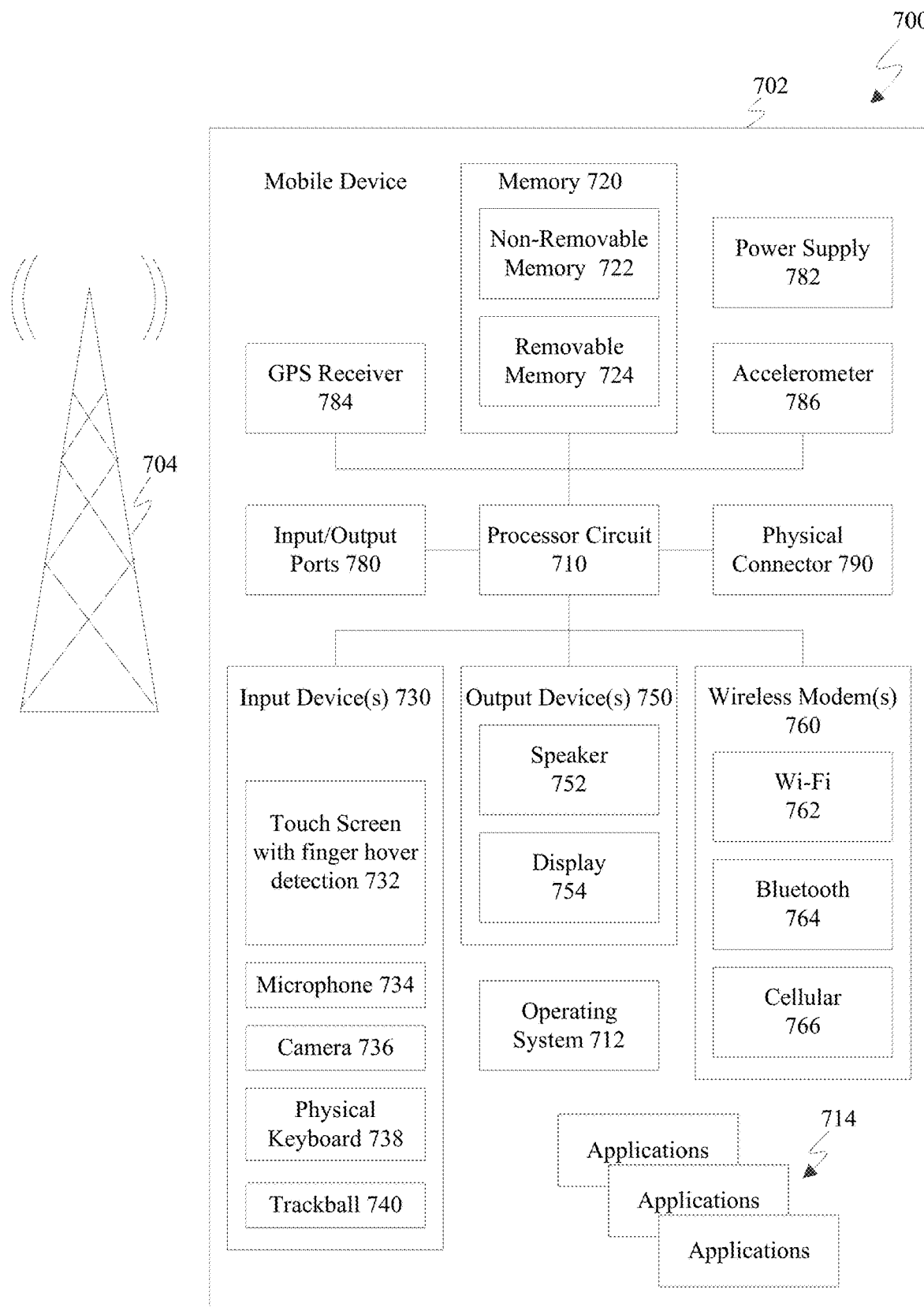

FIG. 7 shows a block diagram of an example mobile device that may be used to implement various example embodiments.

Figure 8:
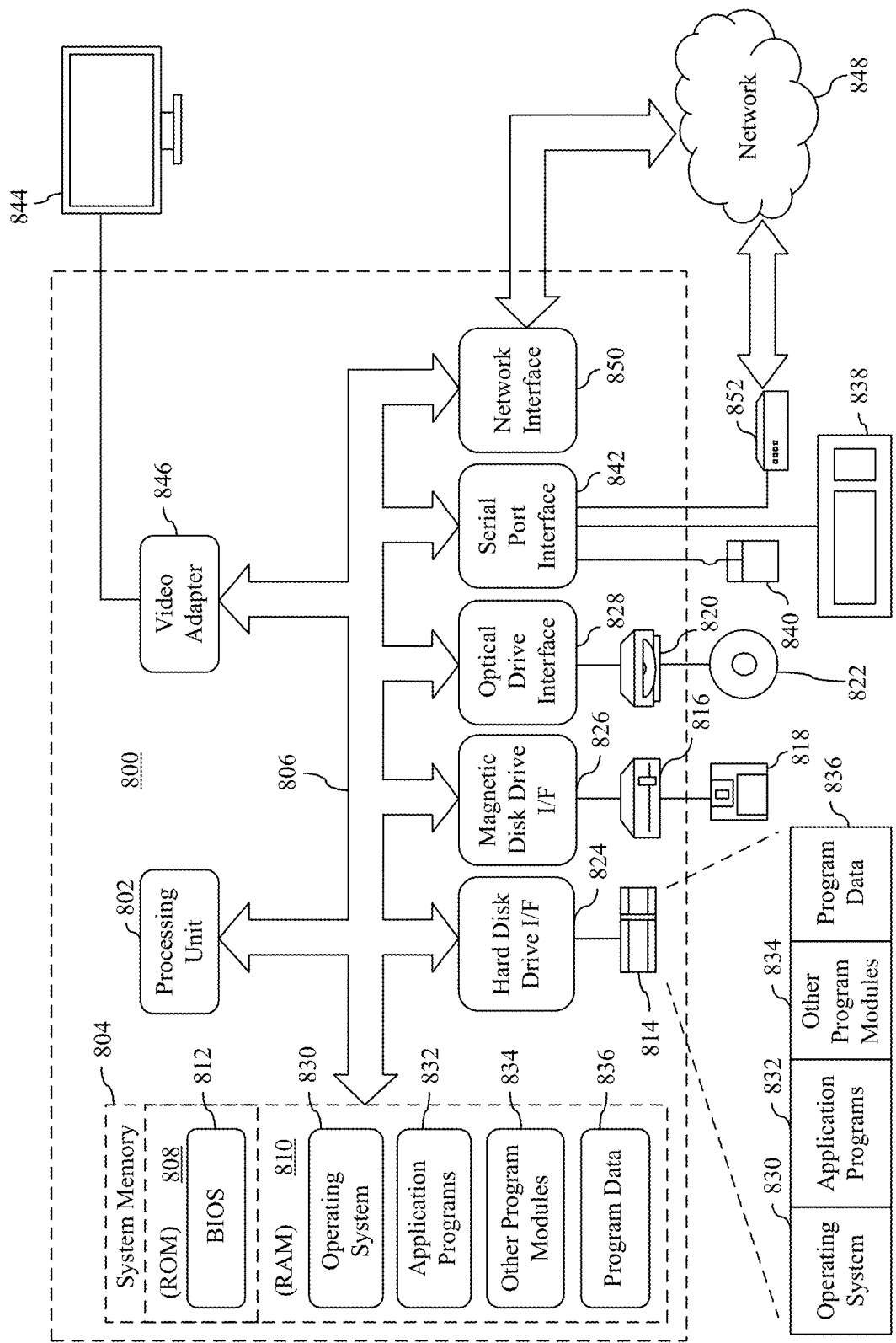

FIG. 8 shows a block diagram of an example computing device that may be used to implement embodiments.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for pen-specific user interface controls. Section III below describes example mobile device and computing device embodiments that may be used to implement features of the embodiments described herein. Section IV below describes additional examples and advantages, and Section V provides some concluding remarks.

II. Example Embodiments for Pen-Specific User Interface Controls

Methods, systems, apparatuses, devices, and computer program products are provided herein for pen-specific user interface controls. Users may apply a touch instrument such as a finger, stylus, or touch pen to a touch interface of a device such as a touch screen to select and/or otherwise interact with content displayed via a user interface (UI). Embodiments herein enable and provide specific UI controls and menus based at least on detections of certain commands from the touch instrument, such as a touch pen. A touch pen as referred to herein is an electronic touch instrument, configured to interact with a device, and may include one or activation controls that cause the pen to send commands and information to the device indicative of activation for an activation control. A specific activation control of the pen is associated with pen-specific UI controls which enables the user to simply and efficiently cause pen-specific UI controls and menus to be presented by the device.

For example, a user may activate pen-specific UI controls and/or menus at a device by activating an activation control of a pen that has been particularly associated with the touch pen menu, such as clicking a tail button. A communication is received by a device, from a touch pen, that indicates an activation control of the touch pen has been activated, e.g., a click of the tail button. The device selects a touch pen menu, from a number of menus available to the device, which includes selectable menu options for launching different pen-specific applications based at least on the received communication indicating the particular activation control is activated at the touch pen. The device then determines menu presentation information that may specify a display, a location, an orientation, and/or the like, for a UI based at least on a state of the UI at a time that is associated with the activation and communication. The touch pen menu is displayed via the UI according to the menu presentation information. A user is thus enabled to select a menu option from the touch pen menu that causes the device to launch a pen application associated with the selected touch pen menu option. It should also be noted that embodiments herein provide for enabling a touch device to present in a menu selections associated with applications that are not touch pen-specific on a display for selection thereof by a user.

As noted above, menu presentation information may specify a display, a location, an orientation, and/or the like, for a UI based at least on a state of the UI. A device, generally, may be referred to herein as a touch device or a user device. Devices may include one or more physical displays by which UIs and menus are displayed/presented to users and by which a touch pen is enabled to interact with the device. For instance, the device may include two physical displays as part of a system UI for presentation of home screens, menus, application-specific UIs, etc. The state of the UI, i.e., the system UI, includes but is not limited to, a handedness setting, an orientation of the device, what is currently being displayed by one or more physical displays, and/or the like, as described herein. The menu presentation information is based at least on this UI state and determines where and how pen-specific menus are presented on the device. Accordingly, the UI is improved at least through the provision of pen-specific menus responsive to specific touch pen activators, and is further improved though the specific placement of the pen-specific menus in consideration of the UI state. Thus, the touch device and its operation are also improved via such operation of the UI at least by requiring less user navigation in order to present pen-specific menu options, as well as presentation of the pen-specific menus in locations that are more easily accessible by the user (including a reduction of input errors) and/or do not disrupt the presentation of other items displayed. These improvements are applicable to single- and multiple-display touch devices, as described herein, where for multiple-display touch devices, the improvements from corresponding locations for touch pen menus on a given one of the displays are increasingly pronounced due to the increased size of the UI and its ability to present additional content over two displays.

As an example, handedness refers to a default or user-specified setting associated with the dominant hand, or the hand that will typically wield a touch pen for interaction with the device, of the user. Embodiments provide for a device to determine a handedness setting from the UI state, and display pen-specific menus on a display that corresponds to the handedness setting (e.g., if the user has opted to configure settings for right-handedness, the device may present or display a pen-specific menu on the right display of the device). Additionally, the pen-specific menu may be displayed vertically, horizontally, at different sides of a display, etc., based at least on device orientation information in the UI state. In scenarios in which the UI state includes information of an executing application that is in focus or is otherwise displayed by the device, a pen-specific menu may be presented to the user on a display that is not currently presenting the UI of the application. Accordingly, and in view of the improvements noted above, the UI is further improved at least through the provision of pen-specific menus in consideration of the orientation of the device, which is maintained in the UI state. Thus, the orientation of the touch device does not inhibit the ease of user navigation for presented pen-specific menu options or the performance of the touch device. The presentation of the pen-specific menus in specific locations and at orientations that remain easily accessible by the user and/or do not disrupt the presentation of other items displayed regardless of orientation improve the touch device operation.

Moreover, pen-specific menus or portions thereof may be presented with other menus or applications by the device based at least on determinations that activation of the other menus or applications is performed using the touch pen, and presentation of options in pen-specific menus may be based at least on user profiles, in embodiments. The described embodiments herein also provide for customization of pen-specific menus.

In other words, the embodiments disclosed herein provide enhanced UI operations and options specific to touch pens via pen-specific user interface controls. These and further embodiments are described in greater detail as follows.

Figure 1A:
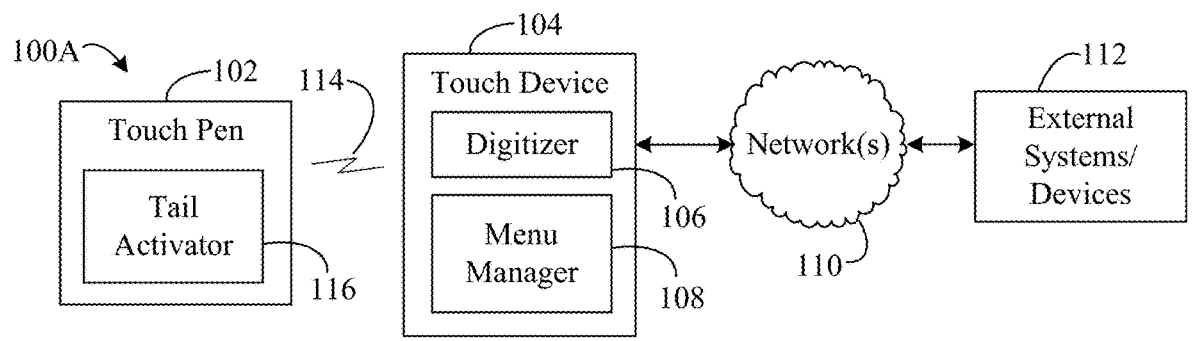
FIG. 1D shows a block diagram of a touch device from the system in FIG. 1A for pen-specific user interface controls, according to an example embodiment.

Systems and devices may be configured in various ways for pen-specific user interface controls. For instance, FIG. 1A is a block diagram of a system 100, according to embodiments. System 100A is configured to enable pen-specific user interface controls, according to embodiments. As shown in FIG. 1A, system 100A includes a touch pen 102, a touch device 104, and external systems/devices 112. In embodiments, touch pen 102 and touch device 104 may communicate with each other via communication signals 114, and touch device 104 and external systems/devices 112 may communicate with each other over a network 110. It should be noted that various numbers of touch instruments, touch devices, and/or external systems/devices may be present in various embodiments. Additionally, any combination of the components illustrated in FIG. 1A may be present in system 100A, according to embodiments.

As noted above, touch device 104 and external systems/devices 112 are communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like. External systems/devices 112 may include servers and/or hosts of software developers and/or providers for software stored and/or executed by touch device 104. For instance, applications, operating systems, UIs, menus, etc., may comprise portions of software stored and/or executed by touch device 104. Touch device 104 is configured to receive any ones of such software, and/or updates thereto, from external systems/devices 112 over network 110. In embodiments, such software and/or updates may include default pen-specific menu settings, program logic for pen-specific menus, etc. External systems/devices 112 may comprise cloud-hosted services, on-premises servers hosting services, and/or the like.

Touch device 104 may be any type of computing device or computing system having an integrated touch interface or a peripheral touch interface, e.g., a touch screen or touch pad, that interfaces with, or comprises, a digitizer 106 associated therewith for interaction with touch instruments, such as touch pen 102. Touch device 104 may be, without limitation, a mobile productivity device, a terminal, a personal computer, a laptop computer, a tablet device, a smart phone, a personal digital assistant, a game console or gaming device, a television, and/or the like that may be utilized by users through interaction with a touch instrument(s), such as touch pen 102, in performance of operations. In embodiments, touch device 104 may be a model of a Surface Duo® from Microsoft Corporation of Redmond, WA, or a similar dual-screen mobile device. Touch pen 102 may be utilized via the touch interface and digitizer 106, e.g., by contact/interaction provided at a touch screen.

Digitizer 106 may comprise a controller, one or more antennas, and/or the like. Digitizer 106 may be configured to receive/transmit communication signals via an antenna(s) from/to touch pen 102, according to embodiments. A controller or processor of digitizer 106 may receive commands and information as communications from touch pen 102. In embodiments, these communications are utilized to determine if a specific activation control of touch pen 102 have been activated, and/or where in a UI a user has selected an option of a menu or application. For example, touch devices described herein may be configured to execute software applications and/or menus that cause content to be displayed to users via UIs associated with touch interfaces.

A menu manager 108 of touch device 104 is configured to determine if pen-specific menus are to be displayed to the user, and if so, where such pen-specific menus are to be displayed. Operations and functions of menu manager 108 are discussed in further detail below.

Touch pen 102 may be any type of touch instrument that includes one or more activation controls. An activation control may be a button, a switch, a slider, a lever, and/or the like, as would be understood by a person of skill in the relevant art(s) having the benefit of this disclosure. As illustrated in FIG. 1A, touch pen 102 includes at least a tail activator 116, which may be a tail button that is activated by as user click thereof, for embodiments herein related to pen-specific user interface controls.

Figure 1B:
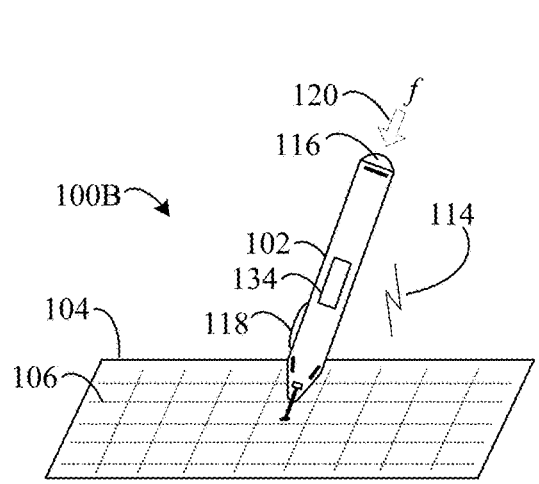
Figure 1C:
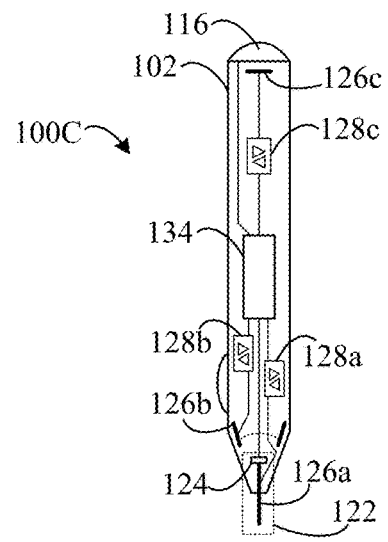

Turning now to FIGS. 1B and 1C, diagrams of touch pens for pen-specific user interface controls are shown, according to example embodiments. FIG. 1B shows a system 100B that includes touch pen 102 of FIG. 1A, as well as touch device 104 and digitizer 106. FIG. 1C shows a system 100C that includes further exemplary details and features of touch pen 102.

In system 100B, touch pen 102 is illustrated as interfacing with antennas of digitizer 106 and with a screen of touch device 104. Touch pen 102 may be held by a user at various distances, with various characteristics, and/or with various orientations with respect to touch device 104 (and digitizer 106). For instance, in an embodiment, touch pen 102 is illustrated in system 100B as being used by a user and that is interacting by contact with touch device 104 at a location relative to digitizer 106 by which the nib of touch pen 102 makes contact, e.g., to indicate a selection of a selectable control, to perform inking, to perform a drag operation, etc.

In another embodiment, touch pen 102 is illustrated in system 100B as being used by a user and that is interacting by communication signals 114 with touch device 104, such as by pressing tail activator 116 of touch pen 102 causing communication signals 114 to be provided by antennas of touch pen 102 to digitizer 106 of touch device 104. For instance, a user may activate tail activator 116 by pressing downward thereupon with a force 120 (or pressure) causing a display of a pen-specific user interface controls, as described herein. Also illustrated is a side activator 118, which may be a button or the like as described herein, and which may be similarly activated. While two activators are shown in FIG. 1B by way of illustration, other numbers of activators may be included with touch pen 102 in other embodiments.

In embodiments, touch pen 102 may include an instance of a controller 134. Controller 134 is configured to perform pen-side operations for pen-specific user interface controls, as described herein. For example, when a user interacts with a touch interface of touch device 104, e.g., via digitizer 106, using touch pen 102 to perform selections of controls, drags, inking operations, etc., controller 134 is configured to receive communication signal information via one or more antennas of touch pen 102 and/or a hardware-based force sensor, and to determine characterization information of touch instrument 102 for operation decisions. In other embodiments, the antenna(s) of touch pen 102 are configured to provide communication signals 114 to touch device 104, as noted above, based at least on controller 134 determining an activation of tail activator 116 via electrical signals provided thereto.

Controller 134 may be implemented in hardware, custom hardware, hardware combined with one or both of software and/or firmware, and/or as program code or instructions encoded on computer-readable storage media, and may be configured to perform any functions and/or operations described herein for pen-specific user interface controls. In embodiments, such functions and/or operations may be performed based at least on one or more lookup tables stored in a memory (not shown, but as would be understood by those of skill in the relevant art(s) having the benefit of this disclosure) of touch pen 102.

System 100C of FIG. 1C shows touch pen 102, including controller 134, as well as sensors and antennas of touch pen 102, according to an example embodiment. For instance, touch pen 102 may include one or more antennas shown in system 100C as an antenna 126a (e.g., a tip antenna), an antenna 126b (e.g., a tilt antenna), and an antenna 126c (e.g., a tail antenna). Each antenna may be configured to transmit and/or receive communication signals such as communication signals 114 to and/or from a touch device, such as touch device 104, via one or more respective transceivers: a transceiver 128a, a transceiver 128b, and a transceiver 128c. In embodiments, these transceivers may be a portion of controller 134, and antenna 126a, antenna 126b, and antenna 126c may be electrically coupled to controller 134 via these transceivers, respectively, as illustrated.

Touch instrument 102 may also include a hardware-based force sensor 122 associated with the pen tip or nib. For example, force sensor 122 may comprise a tip that includes antenna 126a and a sensor portion 124. Sensor portion 124 is configured to sense a force applied to the tip through user interactions with touch instrument 102. Sensor portion 124 may be electrically coupled, and configured to provide indicia of forces sensed thereby, to controller 134, according to embodiments. Accordingly, a touch instrument, such as touch pen 102, may be configured in various ways for improvements and enhancements in touch instruments and UIs associated therewith in pen-specific user interface controls.

Figure 1D:
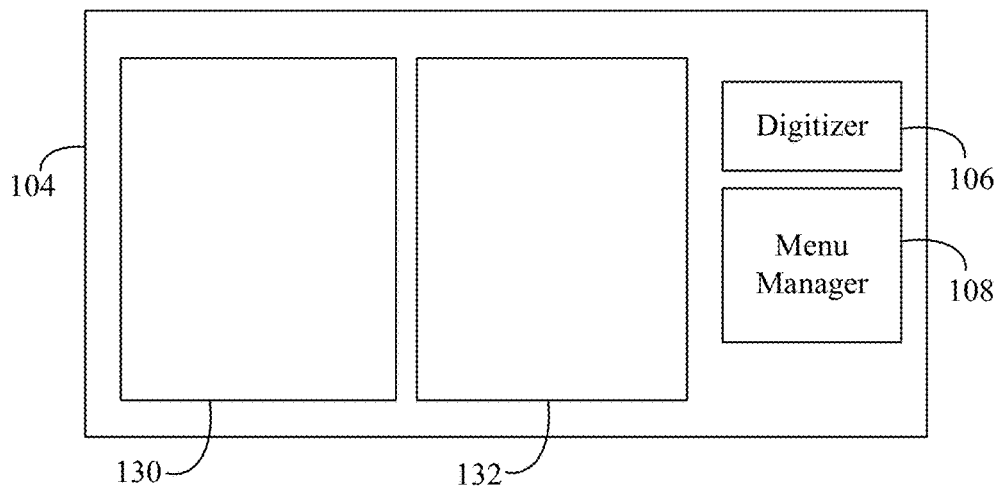

Turning now to FIG. 1D, a block diagram of a system 100D that includes touch device 104 from system 100A in FIG. 1A for pen-specific user interface controls is shown, according to an example embodiment. As illustrated, touch device 104 includes digitizer 106 and menu manager 108, which are described above and in further detail below. Touch device 104 in FIG. 1D also includes a first physical display 130 (also "display 130" hereinafter) and a second physical display 132 (also "display 132" hereinafter). Display 130 and/or display 132 may comprise touch interfaces of touch device 104, and may be combined and/or coupled with digitizer 106 in embodiments. Display 130 and display 132 enable a two-display user experience in embodiments, and provision/presentation of pen-specific user interface controls and/or other UIs, as described herein, may be based at least on the position/orientation of display 130 and display 132, a handedness setting as corresponding to display 130 and/or display 132, a UI state with respect to content displayed by display 130 and/or display 132, etc. While two displays are shown by way of example in FIG. 1D, other numbers of displays are contemplated herein as being included/implemented in various or different embodiments.

Figure 2:
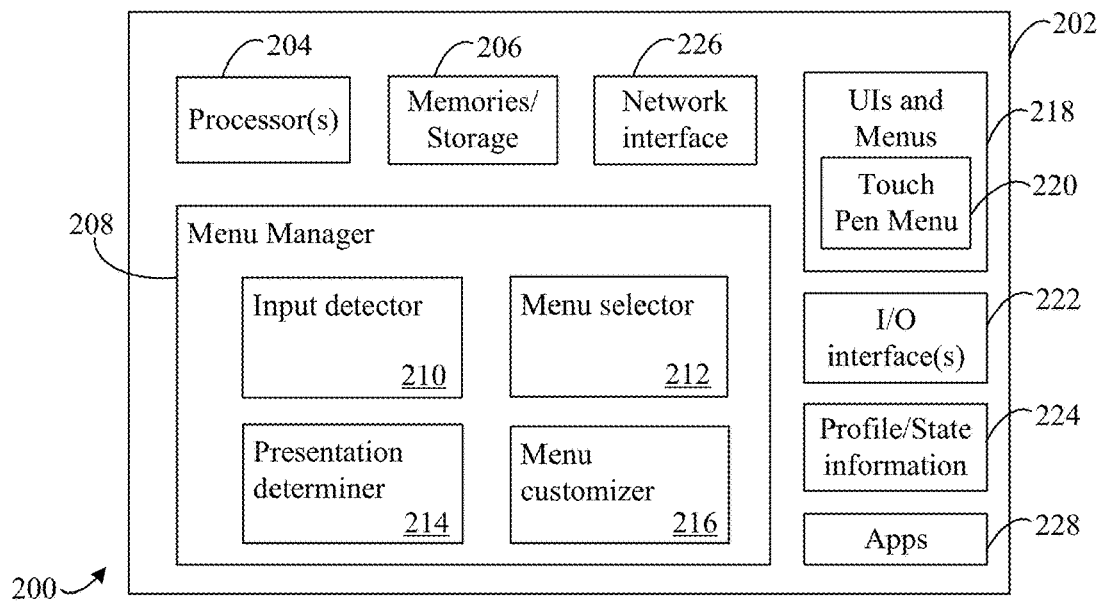
FIG. 2 shows a block diagram of a system for pen-specific user interface controls, according to an example embodiment.

FIG. 2 shows a block diagram of a system 200 of a touch device that is configured for improvements and enhancements in UIs, e.g., for pen-specific user interface controls. System 200 is an embodiment of touch device 104 in system 100A of FIG. 1A, in system 100B of FIG. 1B, and in system 100D of FIG. 1D. For example, system 200 may include a digitizer such as digitizer 106, as well as one or more displays such as display 130 and/or display 132, as described above. System 200 is described as follows.

System 200 includes a computing device 202, which may be an embodiment of touch device 104, and may be any type of computer or computing device, as mentioned elsewhere herein, or as otherwise known. As shown in FIG. 2, system 200 and computing device 202 include one or more of a processor ("processor") 204, one or more of a memory and/or other physical storage device ("memory") 206, one or more network interfaces ("network interface") 226, and a menu manager 208 that may be an embodiment of menu manager 108 of FIGS. 1A and 1D. System 200 may also include UIs and menus 218, an input/output (I/O) interface(s) 222, profile and state information 224, and one or more software applications 228 ("apps" 228). System 200 may also include additional components (not shown for brevity and illustrative clarity) including, but not limited to, components and subcomponents of other devices and/or systems herein, as well as those described below with respect to FIGS. 7 and 8, such as an operating system.

Processor 204 and memory 206 may respectively be any type of processor circuit and memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises hardware circuitry that is configured to execute computer program code or instructions such as but not limited to embodiments of menu manager 208, which may be implemented as computer program code or instructions for pen-specific user interface controls, etc., as described herein. Memory 206 is configured to store such computer program instructions/code, as well as to store other information and data described in this disclosure including, without limitation, UIs and menus 218, profile and state information 224, apps 228, etc.

Network interface 226 may be any type or number of wired and/or wireless network adapter, modem, etc., configured to enable system 200 to communicate with other devices over a network, such as communications between system 200 and other devices utilized in a network as described herein (e.g., external systems/devices 112) over a network such as network 110 as described above with respect to FIG. 1.

I/O interface(s) 222 may comprise hardware and/or software and may support any number of input devices and instruments such as a stylus, a touch pen, a mouse, a touch screen, a touch pad, a microphone, a camera, a kinetic sensor, a physical keyboard, a trackball, virtual reality eyewear, gloves, other wearables or sensors, etc., and/or the like, and one or more output devices such as a speaker, a display screen, and/or the like. Devices such as touch screens and touch pads may support human touch (e.g., with a finger or other body part as the instrument). In embodiments, an I/O interface herein may comprise both input and output portions, e.g., a touchscreen, a headset, smart glasses, etc. Additional I/O devices supported by I/O interface(s) 222 are also contemplated herein, including but not limited to those described below with respect to FIGS. 10 and 11. Further, I/O interface(s) 222 may comprise a digitizer of system 200, such as digitizer 106 described above.

UIs and menus 218 may include, without limitation, any type of software or hardware UI implementation and/or any type of software/application menu. UIs and menus 218 may include, for example, user interfaces and menus displayed to users via output devices described herein that may be interacted with via input devices described herein. UIs and menus 218 may comprise portions of any types of software applications, such as apps 228, which can include, but are not limited to, an OS, pen-specific applications, web browsers, productivity software, electronic mail applications, audio applications, video applications, audio/video applications, 3-D software/virtual environments, drawing/inking software, etc. UIs and menus 218 may display content or representations thereof, as described herein, such as any type of selectable object or control for menus including, without limitation, selectable icons to launch applications such as apps 228, menu configuration/customization options, handles of drawer menus, and/or the like. UIs and menus 218 may include a touch pen menu 220 having pen-specific user interface controls, e.g., selectable controls to launch pen-specific applications. Embodiments for touch pen menu 220 are discussed in further detail below with respect to the instant FIGS.

Profile and state information 224 includes information associated user profiles and device/UI states. User profiles may be, but are not limited to, profiles for different users of a touch device, different profiles for the same user of a touch device (e.g., personal, work, and/or the like), administrator profiles, etc. State information may include a handedness setting, an orientation of the device, what is currently being displayed by one or more physical displays via a UI, and/or the like, as described herein.

Menu manager 208 includes a plurality of components for performing the functions and operations described herein for improvements in UIs via pen-specific user interface controls. As shown, menu manager 208 includes an input detector 210, a menu selector 212, a presentation determiner 214, and a menu customizer 216. While shown separately for illustrative clarity, in embodiments, one or more of input detector 210, menu selector 212, presentation determiner 214, and/or menu customizer 216, may be combined together and/or as a part of other components of system 200. In some embodiments, less than all of the components of menu manager 208 illustrated in FIG. 2 may be included. In software implementations, one or more components of menu manager 208 may be stored in memory 206 and are executed by processor 204.

Input detector 210 may be configured to receive inputs from one or more input interfaces of I/O interface(s) 222. In embodiments, the inputs are generated by interaction with contact/touch instruments via a touch interface. For instance, a stylus, touch pen, user finger, and/or the like may interact with a touchscreen, touchpad, etc. to generate the inputs. Input detector 210 may be configured to determine characterization information or characteristics of the contact instrument interaction with the touch interface, and to identify commands associated with the input for pen-specific user interface controls, such as when a specific activator of a touch pen is activated (e.g., tail activator 116 described above for FIGS. 1A-1C). As an example, one or more of communication signal 114 may be received by a digitizer of system 200, such as digitizer 106, that are indicative of tail activator 116 being activated.

Menu selector 212 may be configured to select a menu from UIs and menus 218, such as touch pen menu 220, based at least on inputs determined by input detector 210. For example, as noted above, when a specific activator of a touch pen is activated, and such a determination is made by input detector 210, menu selector 212 selects touch pen menu 220 for presentation via I/O interface(s) 220.

Presentation determiner 214 may be configured to determine locations and/or orientations for presenting touch pen menu 220. That is, presentation determiner 214 may generate, determine, and/or receive presentation information for touch pen menu 220, and touch pen menu 220 is displayed based at least on this presentation information. Presentation information may be generated, determined, and/or received based at least on profile and state information 224 described above.

Menu customizer 216 may be configured to associate default selectable menu options with touch pen menu 220, associate user-specified changes/customizations for selectable menu options with touch pen menu 220, associate and/or determine selectable menu options with touch pen menu 220 based at least on application usage, and/or the like.

Accordingly, system 200 and menu manager 208 may operate in various ways to enable improvements in UIs via pen-specific user interface controls. Additional details regarding system 200 and menu manager 208 and their respective components are provided below.

Figure 3:
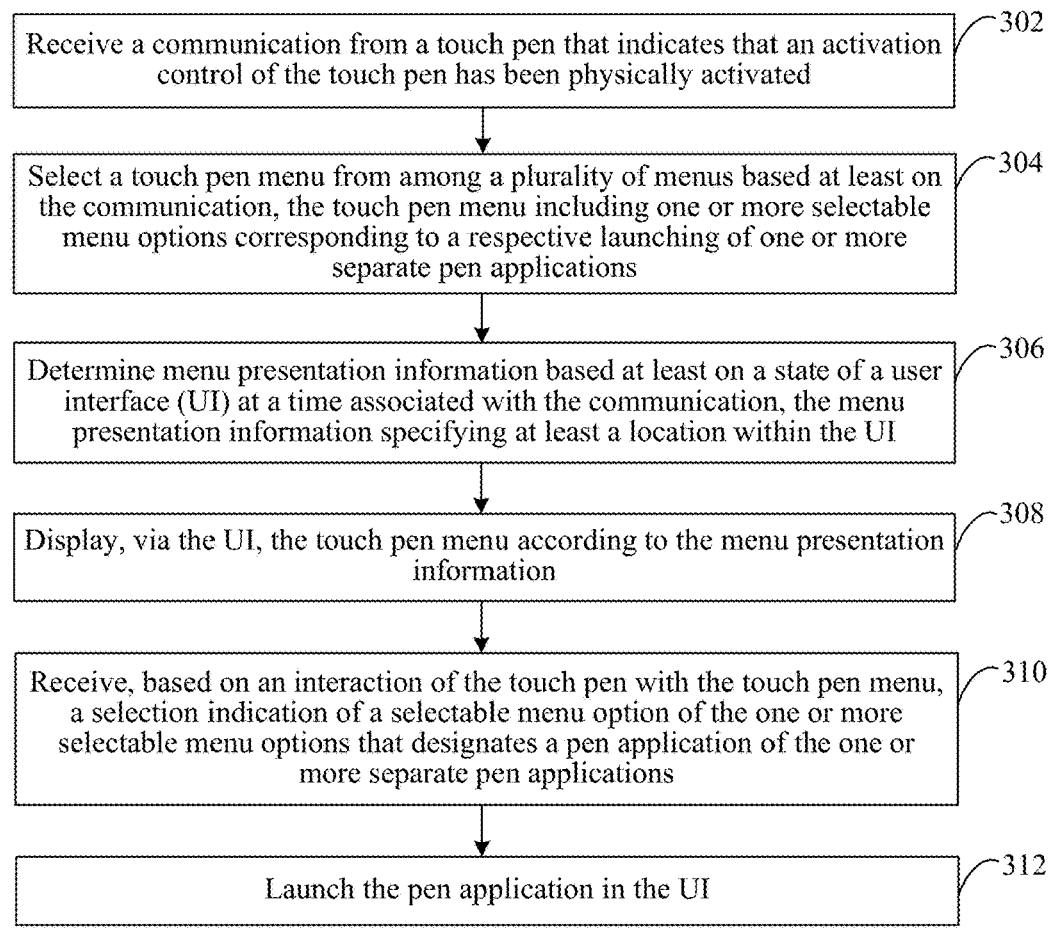
FIG. 3 shows a flowchart for pen-specific user interface controls, in accordance with an example embodiment.

For instance, FIG. 3 shows a flowchart 300 for pen-specific user interface controls, according to an example embodiment. System 200 and menu manager 208 may operate according to flowchart 300, in an embodiment. Further structural and operational examples will be apparent to persons skilled in the relevant art(s) based at least on the following description. Flowchart 300 is described as follows with respect to system 100D of FIG. 1D and system 200 of FIG. 2.

Flowchart 300 begins at step 302. In step 302, a communication is received from a touch pen that indicates that an activation control of the touch pen has been physically activated. For example, input detector 210 may be configured to receive inputs from one or more input interfaces of I/O interface(s) 222 from a touch instrument, such as touch pen 102 in FIGS. 1A-1D. Inputs such as the communication in step 302 may indicate that tail activator 116 of touch pen 102 has been physically activated, as described above. In embodiments, such a communication may be associated with a command to launch and display/present a pen menu for pen-specific user interface controls. The command may be based at least on a touch pen proximity to a touch device (such as system 200) and activation of tail activator 116.

In step 304, a touch pen menu is selected from among a plurality of menus based at least on the communication, the touch pen menu including one or more selectable menu options corresponding to a respective launching of one or more separate pen applications. For instance, input detector 210 may provide indicia of the communication received in step 302 to menu selector 212, which selects touch pen menu 220 from menus of UIs and menus 218. In embodiments, system 200 settings/configurations may be set by a user, or may be set as a default, in a touch device settings menu of system 200 such that a specific pen click indicates that a user desires for touch pen menu to be presented by system 200. Accordingly, menu selector 212 makes such a selection from among the menus of UIs and menus 218.

Touch pen menu 220, described in further detail below, may include pen-specific user interface controls. For example, touch pen menu 220 may include one or more selectable menu options corresponding to a respective launching of one or more separate pen applications (e.g., as icons or the like that when selected by touch pen 102 via contact with a touch device or otherwise, cause the launch and execution of a software application of apps 228 that is associated with the icon).

In step 306, menu presentation information is determined based at least on a state of a user interface (UI) at a time associated with the communication, the menu presentation information specifying at least a location within the UI. As noted above, the UI and the touch device operation are both improved by a specified location within the UI for presenting a touch pen menu that enables accessibility of the menu and that does not interfere with other items displayed on the UI. For example, presentation determiner 214 may be configured to determine menu presentation information, as in step 306. That is, presentation determiner 214 may determine locations and/or orientations for presenting touch pen menu 220, and may generate, determine, and/or receive presentation information for touch pen menu 220 based at least on profile and state information 224 described above. Menu presentation information may include and/or specify a display of one or more displays on which touch pen menu 220 is presented, a location on the display, an orientation of touch pen menu 220, etc., as described herein.

In step 308, the touch pen menu is displayed via the UI according to the menu presentation information. For instance, menu manager 216 may be configured to cause the display of touch pen menu 220 via UIs and menus 218 by I/O interface(s) 222. As an example in the context of FIG. 1D, touch pen menu 220 may be displayed on one of display 130 or display 132 based at least on the menu presentation information determined in step 306. In this way, a particular activation of a control of touch pen 102 enables pen-specific user interface controls to be provided to a user for selection/launching of pen-specific applications from touch pen menu 220.

In step 310, a selection indication of a selectable menu option of the one or more selectable menu options that designates a pen application of the one or more separate pen applications is received based at least on an interaction of the touch pen with the touch pen menu. For example, subsequent to step 308, a user may interact with a selectable menu option of touch pen menu 220 using touch pen 102, where the selectable menu options of touch pen menu 220 include icons, or the like, for pen-specific applications, and the interaction in step 310 may comprise selecting an icon with touch pen 102 for one of the pen-specific applications in touch pen menu 220. This selection may be received/determined by a digitizer of system 200 (not shown for brevity and illustrative clarity, but described above for touch device 104 of which system 200 may be an embodiment).

In step 312, the pen application is launched in the UI. For instance, the selection of a pen-specific application in touch pen menu 220 in step 310 may cause a communication or command to be executed by processor 204 launching the selected, pen-specific application. In embodiments, the executed, pen-specific application, selected from touch pen menu 220, may be displayed via a UI in the same display for which touch pen menu 220 was presented.

Turning now to FIGS. 4A, 4B, 4C, 4D, and 4E, diagrams of user interfaces with pen menus for pen-specific user interface controls are shown, in accordance with example embodiments. The UIs of FIGS. 4A, 4B, 4C, 4D, and/or 4E may be embodiments of system 200 and UIs and menus 218 of FIG. 2, and may be presented/displayed via one or more displays described herein, such as display 130 and/or display 132 of FIG. 1D, which may be included in system 200 of FIG. 2.

Figure 4A:
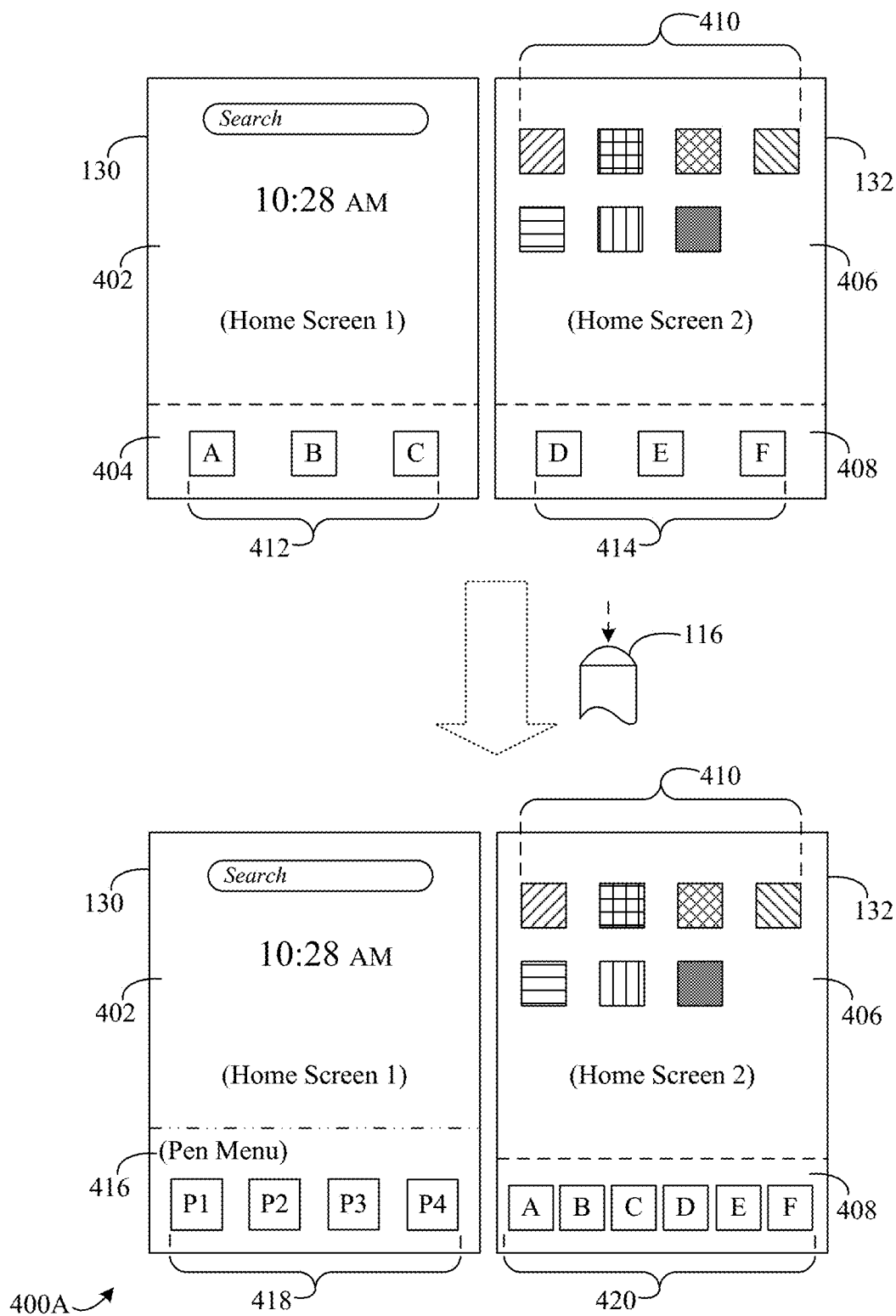

In the embodiment of a UI 400A exemplarily shown in FIG. 4A, display 130 and display 132 are shown as presenting a home screen 402 and a home screen 406 respectively, which are UIs as described herein. UI 400A also includes a menu area 404 and a menu area 408 that are respectively associated with home screen 402 and home screen 406. Menu area 404 and menu area 408 respectively include default options and/or user-specified options that may be selected by a user to launch and execute software applications and/or the like. These selectable options of menu area 404 and menu area 408 may be icons, etc., and may include, as shown for illustration, a first option portion 412 (A, B, and C options) for home screen 402 and a second option portion 414 (D, E, and F options) for home screen 406. Additionally, a home screen of system 400A, illustrated as home screen 406, may present home screen options 410 that may comprise icons, etc., for selection of other software applications, menus, and/or the like.

As described herein, the activating of an activation control of a touch pen, such as a specific activation control, causes the presentation of a touch pen menu having pen-specific user interface controls via a UI of touch device. In the embodiment of UI 400A of FIG. 4A, and by way of example/illustration and not limitation for FIG. 4A and those that follow, such an activation may be performed for a tail activator/button of the touch pen, such as tail activator 116 of touch pen 102 referenced in the description of FIGS. 1A-1D above. When physical activation of tail activator 116 is detected or determined by a touch device, a touch pen menu 416 is displayed or presented via UI 400A. Touch pen menu 416 may be an embodiment of touch pen menu 200 described with respect to FIG. 2.

For example, as shown in FIG. 4A, activating tail activator 116 causes touch pen menu 416 to be displayed/presented on display 130 above home screen 402. Touch pen menu 416 includes one or more pen-specific, selectable menu options (also "options 418" herein) corresponding to a respective launching of one or more separate pen applications (e.g., of apps 228 in FIG. 2) exemplarily illustrated here in FIG. 4A as icons P1, P2, P3, and P4. Touch pen menu 416 may be displayed on display 130, which is on the user's left side with respect to display 132 being on the right side, based at least on a handedness setting for the touch device comprising display 130 and display 132. That is, a user may select, or the system may default to, a handedness setting for the touch device that corresponds to handedness (e.g., the user is right-handed or left-handed; a default to right- or left-handedness may also be used if no user-specific setting is made). While shown on the left side for display 130 in FIG. 4A, embodiments also contemplate right-side presentation for right-handedness settings of the touch device, e.g., via display 132. Handedness settings may comprise a portion of profile and state information 224 of a touch device, as noted above for FIG. 2. Thus, the presentation of touch pen menu 416 may be determined based at least on UI state information as described herein, e.g., via presentation determiner 214 in FIG. 2. It is also contemplated herein that one or more of options 418, as well as embodiments herein for which pen-specific applications are referenced, may be associated with software applications that may interact with a touch pen and/or that are not touch pen specific applications.

In embodiments, first option portion 412 (A, B, and C options) for home screen 402 and second option portion 414 (D, E, and F options) for home screen 406 may be combined as combined options 420 and displayed on the display that is not presenting touch pen menu 416. In FIG. 4A, as an example, because touch pen menu 416 is displayed on display 130 above home screen 402, combined options 420 are displayed on display 132 in menu area 408.

Figure 4B:
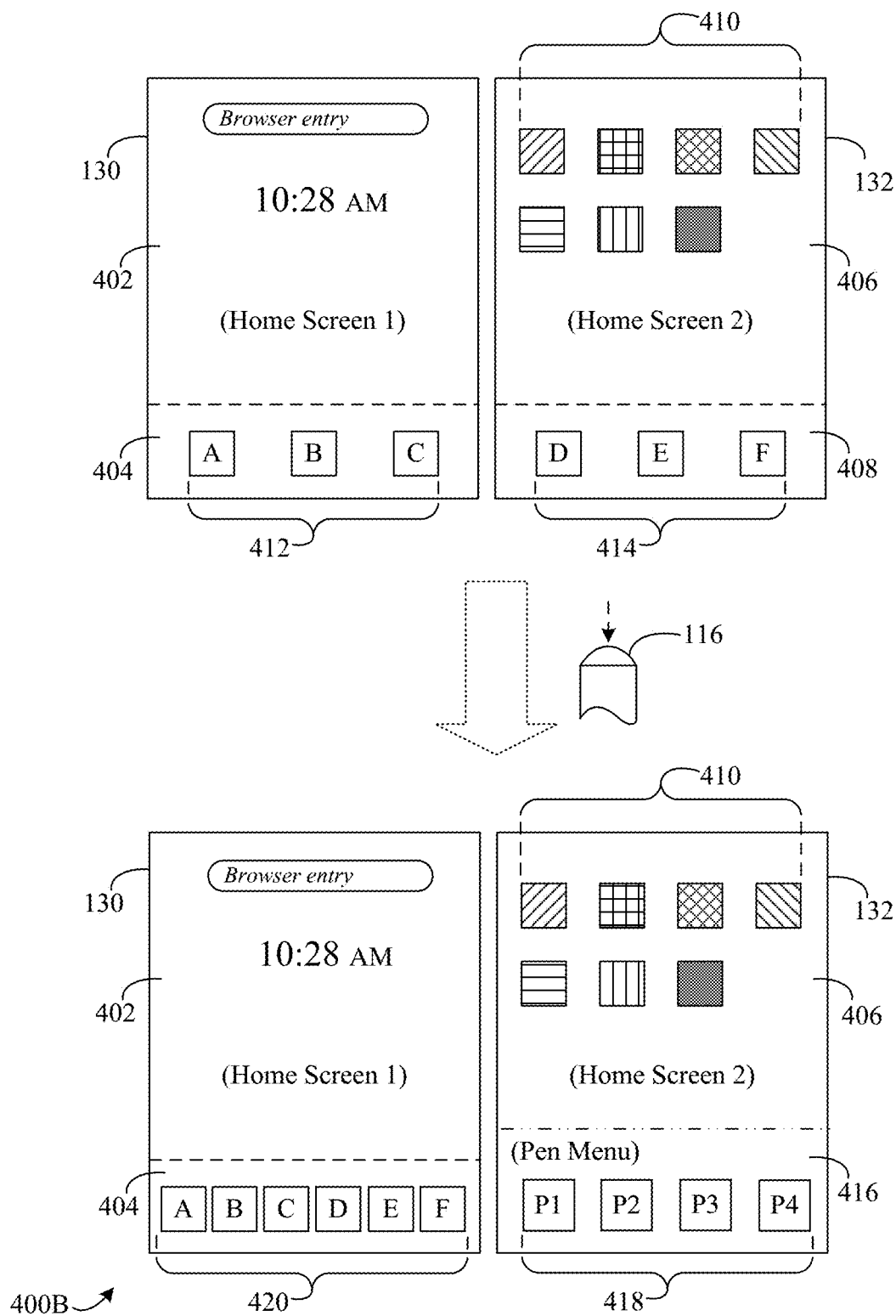

As noted above, right- and left-handedness settings are taken into account for presentation of touch pen menu 416, according to embodiments. FIG. 4B shows a UI 400B of a right-handedness embodiment as an alternative to UI 400A that shows a left-handedness embodiment. In UI 400B, a touch device may have a similar initial UI configuration as described above for UI 400A of FIG. 4A with respect to the presentation of home screen 402 on display 130 and home screen 406 on display 132. However, in this scenario with a right-handedness setting for the touch device, when tail activator 116 is activated as shown in FIG. 4B, the activation causes touch pen menu 416 to be displayed/presented on display 132 above home screen 406 wherein touch pen menu 416 includes the one or more pen-specific, options 418 corresponding to respective launching of pen applications (e.g., icons P1, P2, P3, and P4). In this embodiment, touch pen menu 416 may be displayed on display 132, which is on the user's right side with respect to display 130 being on the left side, based at least on a handedness setting for the touch device. Additionally, combined options 420 are shown in FIG. 4B as being displayed on display 130 (in menu area 404) that is not presenting touch pen menu 416.

Figure 4C:
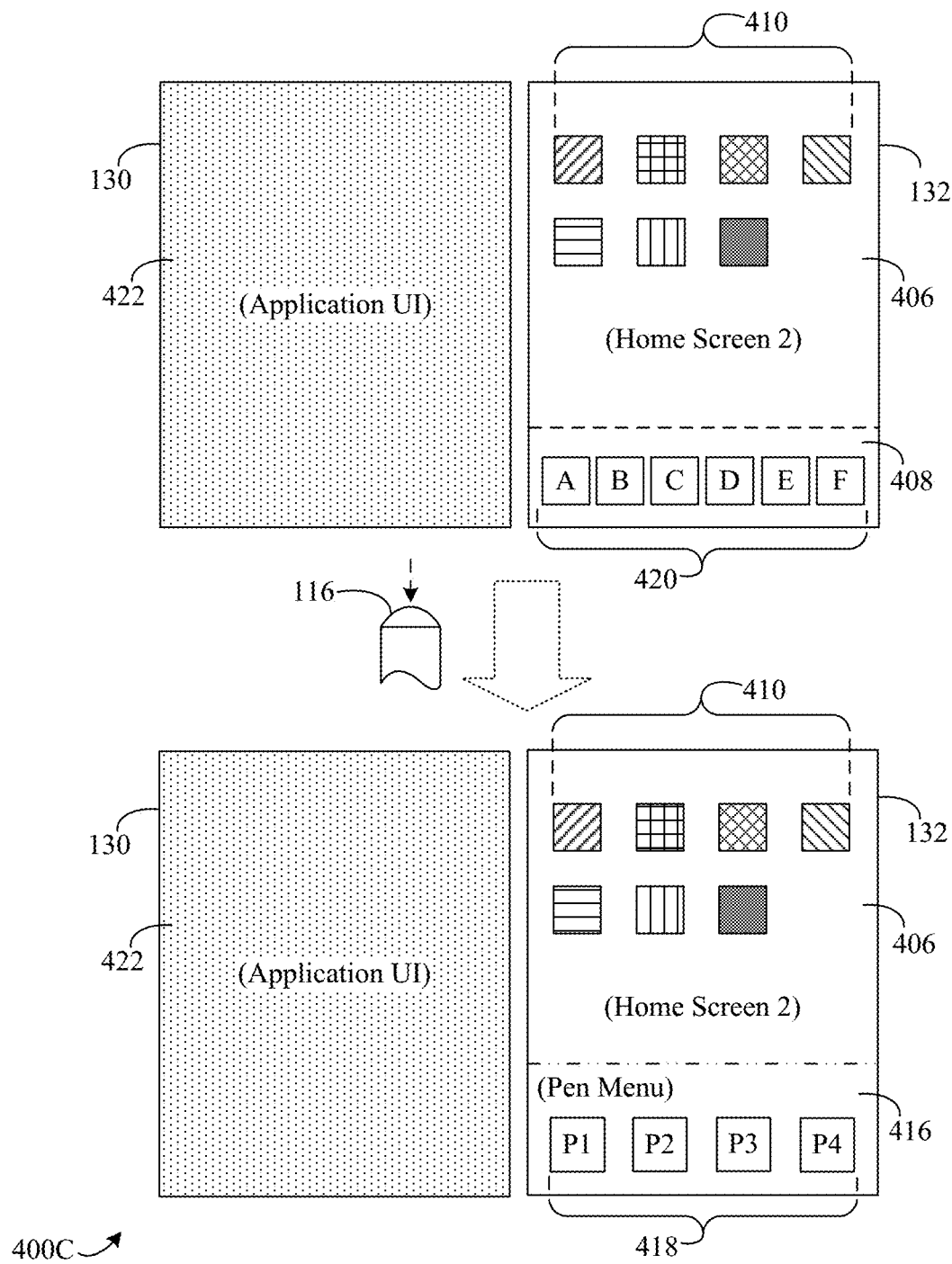

FIG. 4C illustrates a UI 400C in which handedness and/or an active application being displayed may be considered for determining where touch pen menu 416 is presented in the UI. For instance, in FIG. 4C, UI 400C illustrates that an executing application has its application UI 422 presented via display 130. That is, home screen 402 is not displayed on display 130 because application UI 422 is presented thereby. Additionally, as application UI 422 is presented on display 130, combined options 420 may be displayed on display 132 (in menu area 408).

When tail activator 116 of a touch pen is activated in the illustrated embodiment, touch pen menu 416 is caused to be displayed on display 132 above home screen 406 and in place of menu area 408, as shown in FIG. 4C. According to embodiments, the right-side presentation of touch pen menu 416 on display 132 may be determined based at least on left side display 130 already presenting application UI 422 even when a handedness setting is set to left-side. In other embodiments, handedness may take precedence over the display of application UI 422. The display of application UI 422 on display 130 may be stored in profile and state information 224 in FIG. 2, and presentation determiner 214 may base the determination of menu presentation information on the corresponding UI state.

Figure 4D:
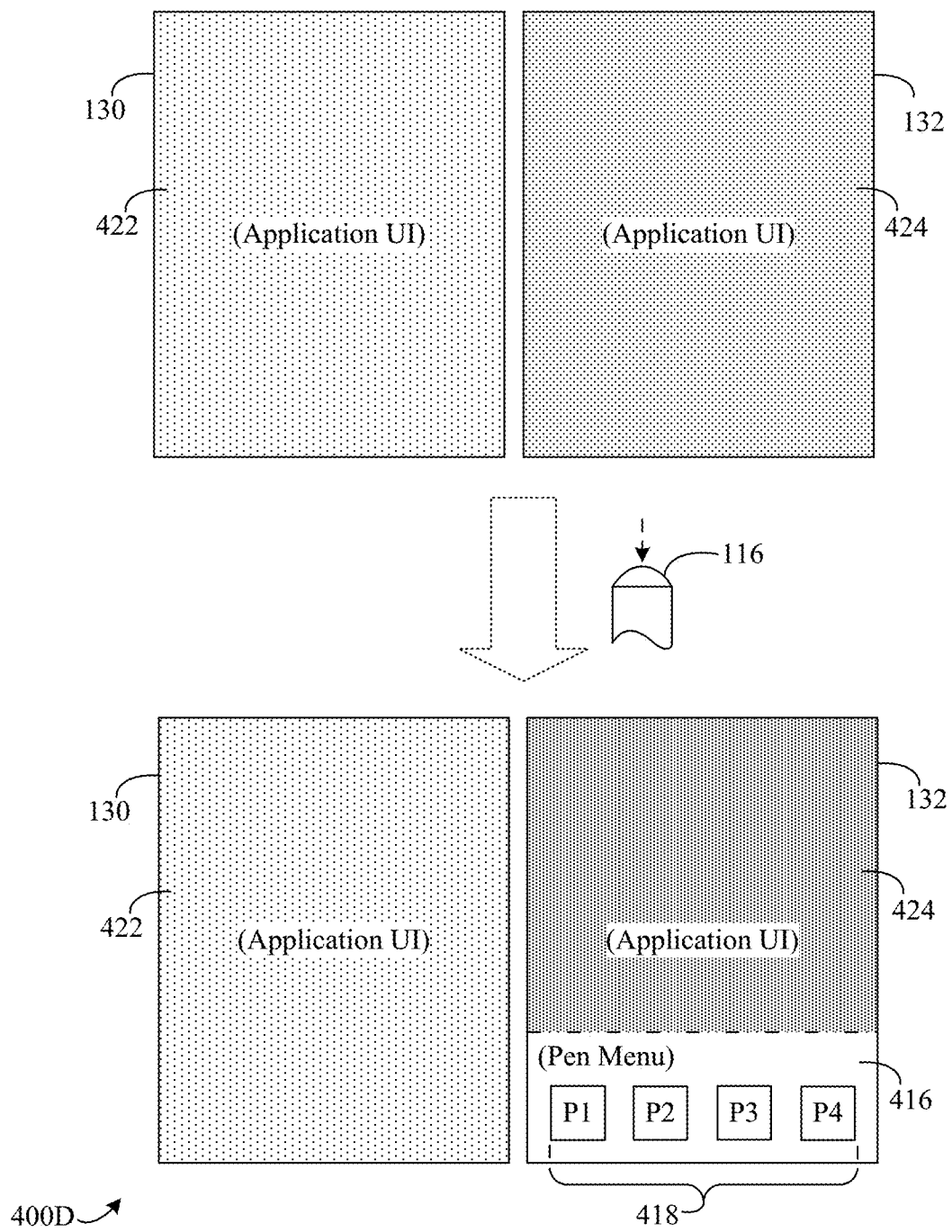

In FIG. 4D, a UI 400D is illustrated in which handedness and/or an active application being displayed may be considered for determining where touch pen menu 416 is presented in the UI. For instance, UI 400D illustrates that an executing application has its application UI 422 presented via display 130, as similarly described above for FIG. 4C, and also illustrates another application UI 424 that is displayed in display 132 for another executing software application.

When tail activator 116 of a touch pen is activated in the illustrated embodiment for FIG. 4D, touch pen menu 416 is caused to be displayed on display 132 above application UI 424. According to embodiments, the right-side presentation of touch pen menu 416 on display 132 may be determined based at least on left side display 130 already presenting application UI 422 and application UI 422 being in focus, even when a handedness setting is set to left-side. In other embodiments, handedness may take precedence over the display of application UI 422, such as for a scenario in which either of application UI 422 or application UI 424 is in focus, but the handedness setting for the touch device indicates a right-handed user. The display of application UI 422 on display 130 and application UI 424 on display 132 may be stored in profile and state information 224 in FIG. 2, and presentation determiner 214 may base the determination of menu presentation information on the corresponding UI state.

Embodiments herein also provide for displaying an application UI for a launched, pen-specific software application in the same display on which touch pen menu 416 was presented. For example, turning again to FIG. 4C and the display of touch pen menu 416 on display 132, in a scenario for which a user selected P2 of options 418, and application UI 424 corresponds to the pen-specific, software application associated with P2, application UI 424 is displayed on display 132 based at least on touch pen menu 416 also having been presented on display 132.

Figure 4E:
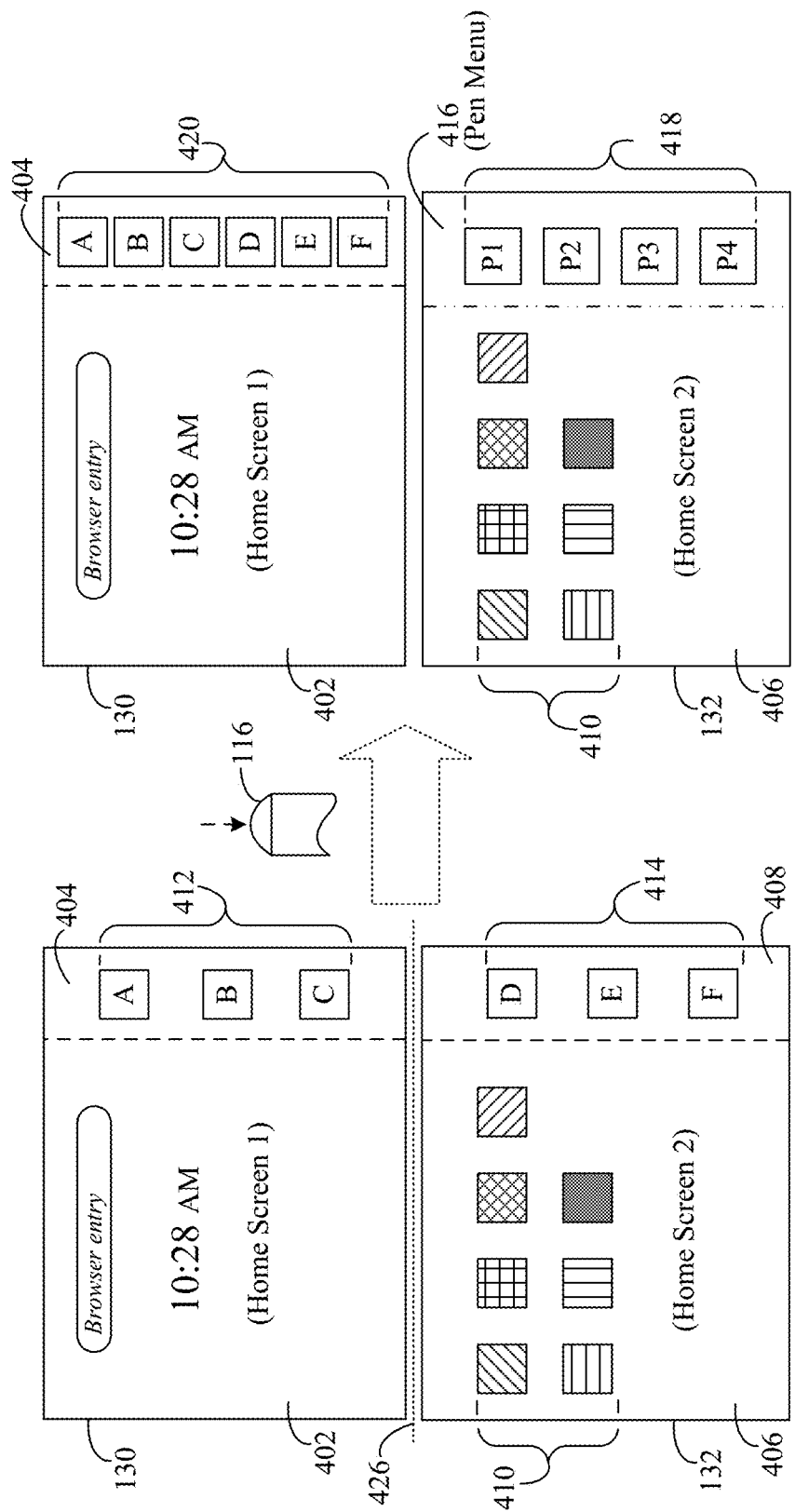

In FIG. 4E, a UI 400E is illustrated as an embodiment of UI 400A in FIG. 4A. UI 400E shows a landscape orientation for display 130 and display 132 in which display 130 is above display 132. For instance, a touch device that includes two displays may be oriented where the displays are side-by-side, e.g., left and right with respect to each other as with an open book (as in FIG. 4A), or where the displays are oriented top-and-bottom as in UI 400E, e.g., similar to opening a laptop computing device. As an example, in the orientation of FIG. 4E for UI 400E, display 130 and display 132 may be oriented about a horizontal axis 426, at various angles. In the illustrated embodiment, display 130 may be referred to as the "top" display relative to display 132, and display 132 may be referred to as the "bottom" display relative to display 130.

The orientation of UI 400E may be determined by one or more accelerometers of the touch device during/after rotating a touch device, may be set in a configuration setting of the touch device, and/or the like. Information for such an orientation as in UI 400E may be stored in profile and state information 224 of FIG. 2, and presentation determiner 214 may base the determination of menu presentation information on the corresponding UI state. Additionally, presentation of menu area 404 and first option portion 412, as well as menu area 408 and second option portion 414, may be determined based at least on the orientation of UI 400E.

In the embodiment illustrated in UI 400E, two home screens are initially presented, shown as home screen 402 and home screen 406, described above, similarly as shown for FIGS. 4A and 4B, but in a landscape orientation. Activating tail activator 116 causes touch pen menu 416 with options 418 to be displayed/presented on display 132 above home screen 406. Touch pen menu 416 may be displayed on display 132, which is the "bottom" display, based at least on the orientation of UI 400E. Additionally, touch pen menu 416 may be displayed on the right side of display 132, based at least on a handedness setting for the touch device (although embodiments also contemplate displaying touch pen menu 416 on the left side of display 132 for a corresponding handedness setting, e.g., displacing or overlaying home screen options 410). Thus, the presentation of touch pen menu 416 may be determined based at least on UI state information as described herein, e.g., via presentation determiner 214 in FIG. 2. As noted above, the UI and the touch device operation are both improved by a specified location within the UI for presenting a touch pen menu that accounts for handedness of a user which, that improves accessibility of the menu at a side of the touch device corresponding to the hand with which the user wields the touch pen.

It is also contemplated herein that, in embodiments for the orientation of UI 400E, the "top" display, i.e., display 130 as illustrated, may be used to present touch pen menu 416 based at least on default device settings, user preference, etc.

FIGS. 5A, 5B, 5C, and 5D will now be described. FIGS. 5A, 5B, 5C, and 5D show diagrams of user interfaces with pen menus for pen-specific user interface controls, in accordance with example embodiments. For example, embodiments herein provide for the display of a touch pen menu, or alternatively, selectable menu options thereof as described herein (e.g., options 418 described above), with other menus/application UIs based at least on touch pen interactions.

Figure 5A:
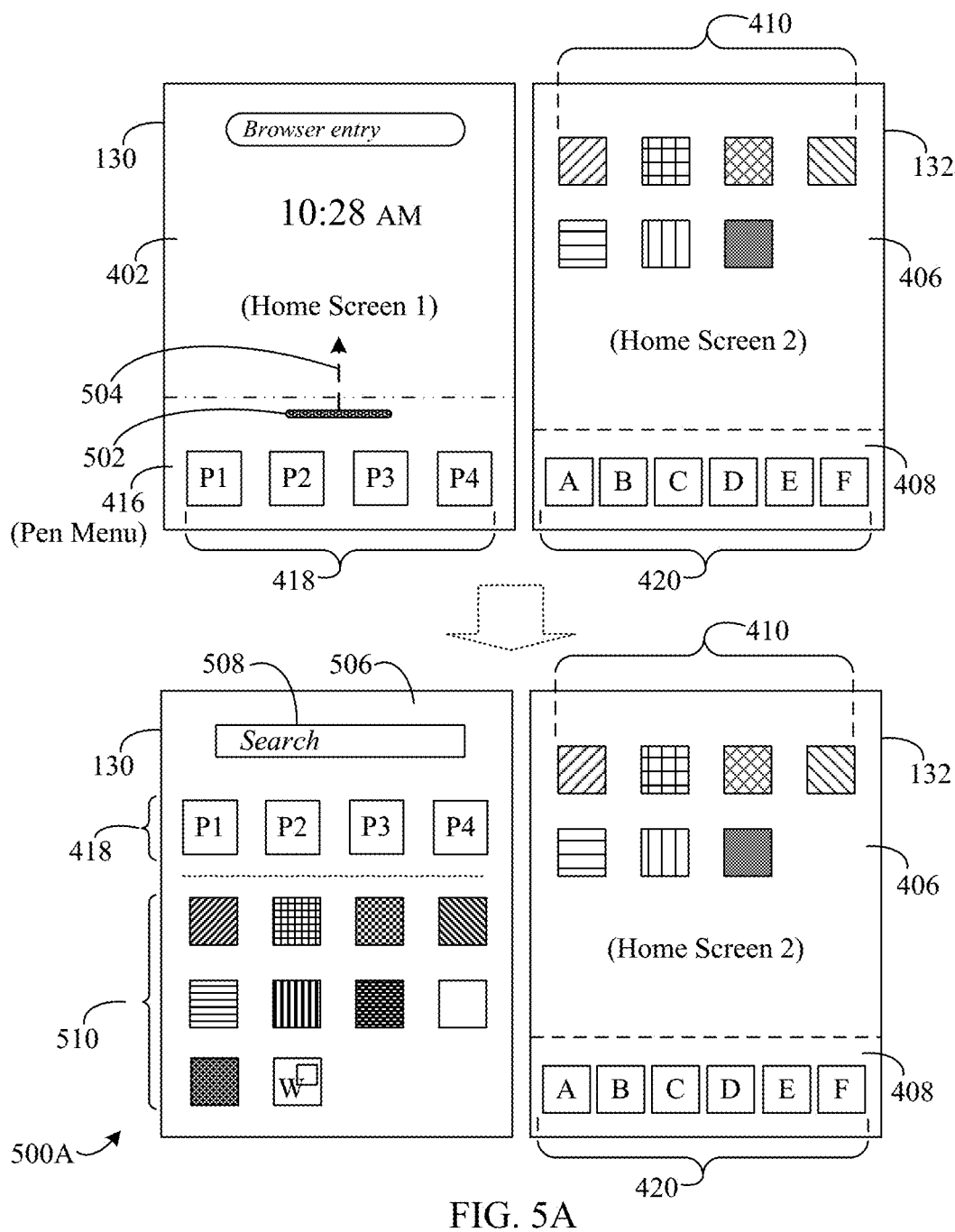

FIG. 5A shows a UI 500A that is an embodiment of UI 400A in FIG. 4A, and that may be adapted to UI 400B of FIG. 4B, UI 400C of FIG. 4C, UI 400D of FIG. 4D, and/or UI 400E of FIG. 4E. UI 500A illustrates, initially, the presentation of touch pen menu 416 on display 130, e.g., subsequent to the activation of an activation control of a touch pen such as tail activator 116, described herein. In addition, UI 500A includes a handle 502 of touch pen menu 416, according to embodiments. Handle 502 may be a control that enables a user to drag touch pen menu 416 and expand it for additional options and features thereof, as described below.

For instance, handle 502 may be dragged "upward" across home screen 402 on display 130 (or any other UI displayed thereon). This drag gesture may be performed using a touch pen, as described herein, such as touch pen 102 in FIGS. 1A-1C, or in other embodiments, by a finger or other touch instrument in some embodiments. A digitizer of a touch device that comprises display 130 and display 132 is configured to detect this dragging interaction by the touch pen and cause a command to be generated to expand touch pen menu 416 into a drawer menu 506 displayed on display 130, as in FIG. 5A for UI 500A. Drawer menu 506 is an embodiment of an expanded pen touch menu 416 having additional options and function described below.

For example, as illustrated, drawer menu 506 may include a search box 508 with which a user interacts to search for applications, menus, webpages, etc. Additionally, options 418 of touch pen menu 416 may be displayed in drawer menu 506 above a list or set of drawer options 510. Drawer options 510 may include selectable control options that correspond software applications and/or menus executable/presentable by the touch device. In embodiments, drawer options 510 may comprise one or more of home screen options 410, control options not included in home screen options 410, and/or the like. Drawer options 510, when including pen-specific, selectable control options in addition to those in options 418, may include such additional pen-specific, selectable control options at the top of drawer options 510, e.g., based at least on a determination that that the drag operation to expand touch pen menu 410 into drawer menu 506 was performed by a touch pen, or otherwise.

Drawer menu 506 may include options and functions based at least on a profile of a user, according to embodiments. For instance, FIG. 5B shows a UI 500B, and FIG. 5C shows a UI 500C, which may be embodiments of UI 500A in FIG. 5A. UI 500B illustrates a variation of drawer menu 506 that includes one or more profile controls 518 that enable a user to specify a user profile to be applied to drawer menu 506. User profiles may be stored as part of profiles and state information 222 in FIG. 2, and may include without limitation, profiles for different users of a touch device, different profiles for the same user of a touch device (e.g., personal, work, and/or the like), administrator profiles, etc.

As shown for UI 500B in FIG. 5B and UI 500C in FIG. 5C, profile controls 518 includes a first profile "Profile A" and a second profile "Profile A", while more profiles are also contemplated herein, that may be selected by a user. With respect to UI 500B, the first profile is selected (which may be by express selection or default), and a set 512 (e.g., P1, P3, and P4) of options 418 associated with this profile are displayed instead of the full number of options 418 (e.g., set 512 does not include (P2) of options 418). In embodiments, drawer options 510 as described above may be displayed for a given, or for each, profile selected. With respect to UI 500C, the second profile is selected (which may be by express selection or default), and a set 514 (e.g., P2) of options 418 associated with this profile are displayed instead of the full number of options 418 (e.g., set 514 is shown to only include (P2) of options 418). In embodiments, a profile selection via profile controls 518 may cause alternate drawer options 516 to be displayed in drawer menu 506 instead of drawer options 510. As an example, if the second profile is a "work" profile, alternate drawer options 516 may include, e.g., productivity application options, or may list such options first in alternate drawer options 516.

Figure 5D:
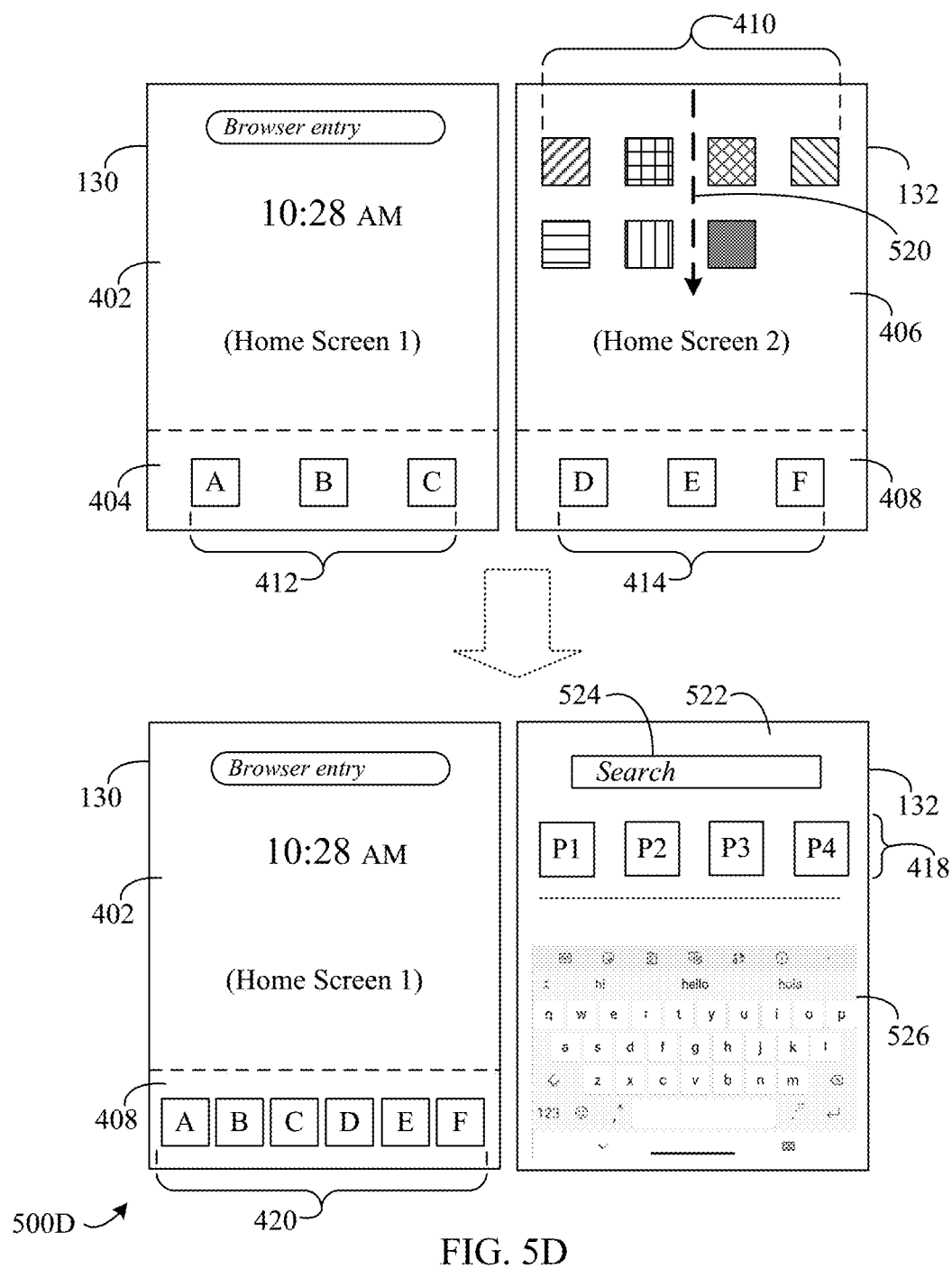
Figure 5B:
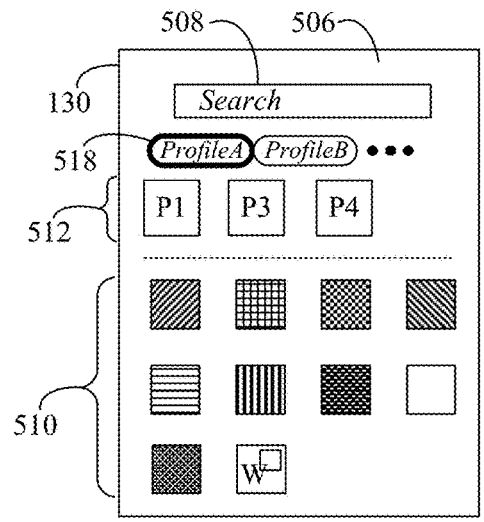
Figure 5C:
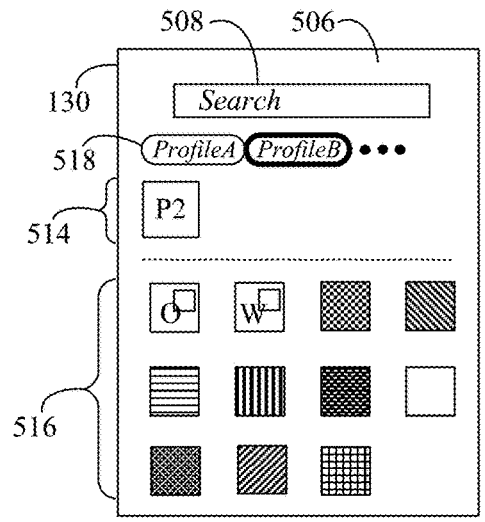

FIG. 5D shows a UI 500D that is an embodiment of UI 400A in FIG. 4A, and that may be adapted to UI 400B of FIG. 4B, UI 400C of FIG. 4C, UI 400D of FIG. 4D, and/or UI 400E of FIG. 4E. UI 500D illustrates, initially, the presentation of home screen 402 on display 130 and of home screen 406 on display 132. In embodiments, a user of a touch device such as those described herein may activate a general search menu by "swiping down" from the top of a display. According to pen-specific user interface control embodiments herein, a user may perform such a "swipe down" using a touch pen, such as touch pen 102 described herein and shown in FIGS. 1A-1C.

For instance, a swipe down operation 520 may be performed using a touch pen for home screen 406 on display 132 (although similar operations for home screen 402 on display 130 are also contemplated). A digitizer of the touch device (e.g., as described for FIG. 1C) comprising display 132 is configured to detect this swiping interaction as being performed by the touch pen and cause a command to be generated to display a search menu 522 that includes search options, e.g., a search box 524 with which a user interacts to search for applications, menus, webpages, etc., a keyboard 526 for text entry of search box 524, and or the like, in addition to displaying options 418 of touch pen menu 416. That is, a typical search menu or application in prior touch devices does not present pen-specific user interface controls when activated, yet the embodiments herein enable a user to be presented with options 418 when search menu 522 is activated by a "swipe" with a touch pen. In embodiments, a "swipe" with a finger instead of a touch pen does not present options 418 in search menu 522.

The embodiments described herein for pen-specific user interface controls also provide for touch pen menu configuration and customization which may be enabled and/or implemented by menu customizer 216 of system 200 in FIG. 2. In this context, FIGS. 6A, 6B, and 6C, each of which show diagrams of user interfaces with pen menus for pen-specific user interface controls, in accordance with example embodiments, will now be described with exemplary reference to FIG. 4A and touch pen menu 416 thereof.

FIG. 6A shows a UI 600A that includes touch pen menu 416. In the illustrated embodiment, UI 600 may be displayed on a display of a device by menu customizer 216, e.g., on display 130 or display 132 as described above and shown in FIG. 4A. Touch pen menu 416, as noted herein, may include options 418 that are selectable by a user and which may correspond to different pen-specific software applications. In some embodiments, in place of one of options 418 may be a selectable customization option, and in such embodiments, options 602, which is an embodiment of options 418, includes a selectable customization option 604, as shown for UI 600A, to configure or customize touch pen menu 416 in conjunction with menu customizer 216. User selection of customization option 604 may cause a pen menu customization UI 606 to be displayed. Pen menu customization UI 606 may be associated with touch device settings, and options, configurations, customizations, changes, and/or the like, made via pen menu customization UI 606 may be saved as touch device settings by menu customizer 216.

As noted above, touch pen menu 416 may initially, or upon updates to a touch device, include default or predetermined selectable options. Pen menu customization UI 606 may display options 602 for user selection and enable a user to add, remove, or otherwise change the selectable options for touch pen menu 416 that correspond to pen-specific applications, which can be launched by option selection. User selections, changes, etc., may be implemented in a touch device via menu customizer 216. For instance, in UI 600A, a user may select customization option 604 and be presented with pen menu customization UI 606 to remove selectable option "P2" from touch pen menu 416. This may be accomplished by displaying a "Remove" option when the user selects "P2" in pen menu customization UI 606, and determining that the "Remove" option is subsequently selected by the user. Menu customizer 216 may then be configured to save the customized changes to settings of the touch device and/or to touch pen menu 416.

Additionally, or alternatively, a user may select customization option 604 while pen menu customization UI 606 is displayed causing the touch device to display an applications list 608 on the display. Applications list 608 may include selectable options for applications on the touch device that the user can add to touch pen menu 416 as one of options 418 or options 602, and may also include an "Empty" option should the user desire to not add an application from application list 608. Menu customizer 216 may then be configured to save the customized changes to settings of the touch device and/or to touch pen menu 416.

FIG. 6B shows a UI 600B that is an embodiment of pen menu customization UI 606. For instance, UI 600B illustrates the ability of a user to reorder options 602 subsequent to pen menu customization UI 606 being displayed, e.g., as described above for UI 600A in FIG. 6A. In a non-limiting example, a user may use a touch pen as described herein, or another touch instrument, to drag one of options 602 of touch pen menu 416 to another position. As shown in FIG. 6B for UI 600B, selectable option "P2" is dragged by the user to the position occupied by selectable option "P3." Accordingly, "P3" may be automatically moved to the position previously occupied by selectable option "P2" as shown for options 602' in FIG. 6B. Menu customizer 216 may then be configured to save the customized changes to settings of the touch device and/or to touch pen menu 416.

FIG. 6C shows a UI 600C that may be presented on a display of a touch device, e.g., display 130 or display 132 as noted above and shown in the instant FIGS., and that may be accessible via pen menu customization UI 606 and/or via a touch device settings menu of a touch device. UI 600C displays a single-click menu 610 that includes options by which a user may select actions for a single click of a touch pen, e.g., a single-click of a tail activator as described above. One of the options of single-click menu 610 may be a "Pen Menu" option that configures the touch device to perform one or more embodiments for pen-specific user interface controls, as described herein. In embodiments, the "Pen Menu" option may be set by default, by updates to the touch device, by user selection via single-click menu 610, and/or the like.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including systems 100A-100D of FIGS. 1A-1D, respectively, system 200 of FIG. 2, and any UIs of FIGS. 4A-4E, FIGS. 5A-5D, and/or FIGS. 6A-6C, along with any components and/or subcomponents thereof, as well as the flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

FIG. 7 is a block diagram of an exemplary mobile system 700 that includes a mobile device 702 that may implement embodiments described herein. For example, mobile device 702 may be used to implement any system, client, or device, or components/subcomponents thereof, in the preceding sections. As shown in FIG. 7, mobile device 702 includes a variety of optional hardware and software components. Any component in mobile device 702 can communicate with any other component, although not all connections are shown for ease of illustration. Mobile device 702 can be any of a variety of computing devices (e.g., cell phone, smart phone, handheld computer, Personal Digital Assistant (PDA), etc.) and can allow wireless two-way communications with one or more mobile communications networks 704, such as a cellular or satellite network, or with a local area or wide area network.

Mobile device 702 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components of mobile device 702 and provide support for one or more application programs 714 (also referred to as "applications" or "apps"). Application programs 714 may include common mobile computing applications (e.g., e-mail applications, calendars, contact managers, web browsers, messaging applications) and any other computing applications (e.g., word processing applications, mapping applications, media player applications).

Mobile device 702 can include memory 720. Memory 720 can include non-removable memory 722 and/or removable memory 724. Non-removable memory 722 can include RAM, ROM, flash memory, a hard disk, or other well-known memory devices or technologies. Removable memory 724 can include flash memory or a Subscriber Identity Module (SIM) card, which is well known in GSM communication systems, or other well-known memory devices or technologies, such as "smart cards." Memory 720 can be used for storing data and/or code for running operating system 712 and application programs 714. Example data can include web pages, text, images, sound files, video data, or other data to be sent to and/or received from one or more network servers or other devices via one or more wired or wireless networks. Memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 720. These programs include operating system 712, one or more application programs 714, and other program modules and program data. Examples of such application programs or program modules may include, for example, computer program logic (e.g., computer program code or instructions) for implementing one or more of systems 100A-100D of FIGS. 1A-1D, respectively, system 200 of FIG. 2, and any UIs of FIGS. 4A-4E, FIGS. 5A-5D, and/or FIGS. 6A-6C, along with any components and/or subcomponents thereof, as well as the flowcharts/flow diagrams described herein, including portions thereof, and/or further examples described herein.

Mobile device 702 can support one or more input devices 730, such as a touch screen 732, a microphone 734, a camera 736, a physical keyboard 738 and/or a trackball 740 and one or more output devices 750, such as a speaker 752 and a display 754. Other possible output devices (not shown) can include piezoelectric or other haptic output devices. Some devices can serve more than one input/output function. For example, touch screen 732 and display 754 can be combined in a single input/output device. In embodiments, mobile device 702 may include two or more physical instances of touch screen 732 and/or display 754. Input devices 730 can include a Natural User Interface (NUI).

One or more wireless modems 760 can be coupled to antenna(s) (not shown) and can support two-way communications between processor 710 and external devices, as is well understood in the art. Modem 760 is shown generically and can include a cellular modem 766 for communicating with the mobile communication network 704 and/or other radio-based modems (e.g., Bluetooth 764 and/or Wi-Fi 762). At least one wireless modem 760 is typically configured for communication with one or more cellular networks, such as a GSM network for data and voice communications within a single cellular network, between cellular networks, or between the mobile device and a public switched telephone network (PSTN).

Mobile device 702 can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components of mobile device 702 are not required or all-inclusive, as any components can be deleted and other components can be added as would be recognized by one skilled in the art.

In an embodiment, mobile device 702 is configured to implement any of the above-described features of flowcharts herein. Computer program logic for performing any of the operations, steps, and/or functions described herein may be stored in memory 720 and executed by processor 710.

FIG. 8 depicts an exemplary implementation of a computing device 800 in which embodiments may be implemented. For example, embodiments described herein may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems and/or game consoles, etc., as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802.

Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing embodiments described herein, such as systems 100A-100D of FIGS. 1A-1D, respectively, system 200 of FIG. 2, and any UIs of FIGS. 4A-4E, FIGS. 5A-5D, and/or FIGS. 6A-6C, along with any components and/or subcomponents thereof, as well as the flowcharts/flow diagrams described herein, including portions thereof, and/or further examples described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers. In embodiments, display screen 844 may include two or more physical display screens.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media (including memory 820 of FIG. 8). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, based at least on execution thereof or loading thereof by an application, enable computing device 800 to implement features of embodiments discussed herein. Accordingly, such computer programs represent controllers of the computing device 800.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

While embodiments described in the Sections above may be described in the context of a touch pen and touch inputs via touch interfaces of touch devices, the embodiments herein are not so limited and may also be applied through other input devices. It is also contemplated herein that selectable options for touch pen menus, as well as other menus described herein that are presented based on specific touch pen activators, may be associated with software applications that may interact with a touch pen and/or that are not touch pen specific applications. For example, it is contemplated herein that a mix selectable options associated with touch pen applications for which touch pen functionality is mainly utilized and associated with applications that are not specific to touch pens may be presented in menus, for various embodiments.

Furthermore, the described embodiments do not exist in software implementations for enhancements and improvements to UIs, much less for pen-specific user interface controls. Conventional solutions lack the ability to customize UIs for pen-specific user interface controls based at least on specific interactions with touch pens.

The additional examples and embodiments described in this Section may be applicable to examples disclosed in any other Section or subsection of this disclosure.

A system is described herein. The system may be configured and enabled in various ways for pen-specific user interface controls, as described herein. The system includes a memory that stores program code, and a processing system, that includes one or more processors, configured to receive the program code from the memory and, in response to at least receiving the program code, to: receive a communication from a touch pen that indicates that an activation control of the touch pen has been physically activated, select a touch pen menu from among a plurality of menus based at least on the communication, the touch pen menu including one or more selectable menu options corresponding to a respective launching of one or more separate pen applications, determine menu presentation information based at least on a state of a user interface (UI) at a time associated with the communication, the menu presentation information specifying at least a location within the UI, and display, via the UI, the touch pen menu according to the menu presentation information.

In an embodiment of the system, the activation control of the touch pen includes a tail activator, and the processing system is configured, in response to the at least receiving the program code, to determine the location within the UI based at least on a handedness setting of the state of the UI.

In an embodiment, the system further includes a first physical display and a second physical display configured to respectively display a first portion of the UI and a second portion of the UI, and the processing system is configured, in response to the at least receiving the program code, to determine the location within the UI as being within the first portion of the UI based at least on at least one of: the first portion of the UI corresponding to a handedness setting of the state of the UI, or the state of the UI indicating the first portion of the UI displays a home screen and the second portion of the UI displays an executing application that is in focus In an embodiment of the system, the processing system is configured, in response to the at least receiving the program code, to: receive, based at least on an interaction of the touch pen with the touch pen menu, a selection indication of a selectable menu option of the one or more selectable menu options that designates a pen application of the one or more separate pen applications, and launch the pen application in the first portion of the UI on the first physical display based at least on the location within the UI.

In an embodiment, the system further includes a first physical display and a second physical display configured to respectively display, in a vertically-aligned orientation, a first portion of the UI beneath a second portion of the UI, and the processing system is configured, in response to the at least receiving the program code, to determine the menu presentation information based at least on the state of the UI indicating the first portion of the UI is beneath the second portion of the UI, the menu presentation information specifying at least: that the location within the UI is within the first portion of the UI, and an orientation of the touch pen menu that designates a vertical display thereof.

A method performed by a computing device is also described herein. The method may be for pen-specific user interface controls, as described herein. The method includes receiving a communication from a touch pen that indicates an activation control of the touch pen has been physically activated, selecting a touch pen menu from among a plurality of menus based at least on the communication, the touch pen menu including one or more selectable menu options corresponding to a respective launching of one or more separate pen applications, determining menu presentation information based at least on a state of a user interface (UI) at a time associated with the communication, the menu presentation information specifying at least a location within the UI, and displaying, via the UI, the touch pen menu according to the menu presentation information.

In an embodiment of the method, the activation control of the touch pen includes a tail activator, and the method further includes determining the location within the UI based at least on a handedness setting of the state of the UI.

In an embodiment of the method, the computing device includes a first physical display and a second physical display configured to respectively display a first portion of the UI and a second portion of the UI, and the method further includes determining the location within the UI as being within the first portion of the UI based at least on at least one of: the first portion of the UI corresponding to a handedness setting of the state of the UI, or the state of the UI indicating the first portion of the UI displays a home screen and the second portion of the UI displays an executing application that is in focus.

In an embodiment, the method further includes receiving, based at least on an interaction of the touch pen with the touch pen menu, a selection indication of a selectable menu option of the one or more selectable menu options that designates a pen application of the one or more separate pen applications, and launching the pen application in the first portion of the UI on the first physical display based at least on the location within the UI.

In an embodiment of the method, the touch pen menu includes an interactive handle, and the method further includes: detecting a drag of the interactive handle across the UI, and displaying, via the UI, an expansion of the touch pen menu as a drawer, the drawer including the one or more selectable menu options in a top row of the drawer and including one or more selectable drawer options below the top row.

In an embodiment of the method, the one or more selectable menu options in the top row of the drawer correspond to: a first set of options based at least on a first profile of a user, or a second set of options based at least on a second profile the user.

In an embodiment of the method, the one or more selectable menu options include a customization option, and the method further includes: receiving, based at least on an interaction of the touch pen with the customization option, a menu customization indication, and displaying a first sub-menu in the UI responsive to the menu customization indication, the first sub-menu including selectable customization options that include at least one of: reordering of the one or more selectable menu options, adding a selectable menu option to the one or more selectable menu options, or removing one of the one or more selectable menu options.

In an embodiment, the method further includes, prior to said displaying, determining at least one of the one or more selectable menu options based at least on one or more of: a pre-determined set of pen applications that are executable by the computing device, or a usage metric associated with one or more pen applications that have been executed by the computing device, and the method further includes associating the one or more selectable menu options with the touch pen menu.

In an embodiment, the method further includes detecting a drag gesture of the touch pen across the UI that is indicative of executing a search application, executing the search application responsive to said detecting, and displaying via the UI: a search UI of the executed search application, and the one or more selectable menu options in the search UI based at least on the drag gesture being performed with the touch pen.

A computer-readable storage medium having program code recorded thereon that, based at least on execution of the program code by a computing device, perform a method, is also described. The method may be for pen-specific user interface controls, as described herein. The method includes receiving a communication from a touch pen that indicates an activation control of the touch pen has been physically activated, selecting a touch pen menu from among a plurality of menus based at least on the communication, the touch pen menu including one or more selectable menu options corresponding to a respective launching of one or more separate pen applications, determining menu presentation information based at least on a state of a user interface (UI) at a time associated with the communication, the menu presentation information specifying at least a location within the UI, and displaying, via the UI, the touch pen menu according to the menu presentation information.

In an embodiment of the computer-readable storage medium, the activation control of the touch pen includes a tail activator, and the method further includes determining the location within the UI based at least on a handedness setting of the state of the UI.

In an embodiment of the computer-readable storage medium, the computing device includes a first physical display and a second physical display configured to respectively display a first portion of the UI and a second portion of the UI, and the method further includes determining the location within the UI as being within the first portion of the UI based at least on at least one of: the first portion of the UI corresponding to a handedness setting of the state of the UI, or the state of the UI indicating the first portion of the UI displays a home screen and the second portion of the UI displays an executing application that is in focus.

In an embodiment of the computer-readable storage medium, the method includes: receiving, based at least on an interaction of the touch pen with the touch pen menu, a selection indication of a selectable menu option of the one or more selectable menu options that designates a pen application of the one or more separate pen applications, and launching the pen application in the first portion of the UI on the first physical display based at least on the location within the UI.

In an embodiment of the computer-readable storage medium, the touch pen menu includes an interactive handle, and the method further includes: detecting a drag of the interactive handle across the UI, and displaying, via the UI, an expansion of the touch pen menu as a drawer, the drawer including the one or more selectable menu options in a top row of the drawer and including one or more selectable drawer options below the top row.

In an embodiment of the computer-readable storage medium, the one or more selectable menu options in the top row of the drawer correspond to: a first set of options based at least on a first profile of a user, or a second set of options based at least on a second profile the user.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system, comprising:
a memory that stores program code; and
a processing system, comprising one or more processors, configured to receive the program code from the memory and, in response to at least receiving the program code, to:
receive a communication from a touch pen that indicates that an activation control of the touch pen has been physically activated;
select a touch pen menu from among a plurality of menus based at least on the communication indicating that the activation control of the touch pen has been physically activated, the touch pen menu including one or more selectable menu options corresponding to a respective launching of one or more separate pen applications;
determine menu presentation information based at least on a state of a user interface (UI) at a time associated with the communication, the menu presentation information specifying at least a location within the UI;
display, via the UI, the touch pen menu according to the menu presentation information, the touch pen menu comprising an interactive handle;
detect a drag of the interactive handle across the UI; and
display, via the UI, an expansion of the touch pen menu as a drawer, the drawer including:
the one or more selectable menu options in a top row of the drawer, and
one or more selectable drawer options below the top row, the one or more selectable menu options in the top row of the drawer corresponding to:
a first set of options based at least on a first profile of a user, the first profile being selectable by a first profile UI option displayed in the drawer, or
a second set of options based at least on a second profile of the user, the second profile being selectable by a second profile UI option displayed in the drawer.

2. The system of claim 1, wherein the activation control of the touch pen comprises a tail activator; and
wherein the processing system is configured, in response to the at least receiving the program code, to determine the location within the UI based at least on a handedness setting of the state of the UI.

3. The system of claim 1, further comprising a first physical display and a second physical display configured to respectively display a first portion of the UI and a second portion of the UI; and
wherein the processing system is configured, in response to the at least receiving the program code, to determine the location within the UI as being within the first portion of the UI based at least on at least one of:
the first portion of the UI corresponding to a handedness setting of the state of the UI; or
the state of the UI indicating the first portion of the UI displays a home screen and the second portion of the UI displays an executing application that is in focus.

4. The system of claim 3, wherein the processing system is configured, in response to the at least receiving the program code, to:
- receive, based at least on an interaction of the touch pen with the touch pen menu, a selection indication of a selectable menu option of the one or more selectable menu options that designates a pen application of the one or more separate pen applications; and
- launch the pen application in the first portion of the UI on the first physical display based at least on the location within the UI.

5. The system of claim 1, further comprising a first physical display and a second physical display configured to respectively display, in a vertically-aligned orientation, a first portion of the UI beneath a second portion of the UI; and
- wherein the processing system is configured, in response to the at least receiving the program code, to determine the menu presentation information based at least on the state of the UI indicating the first portion of the UI is beneath the second portion of the UI, the menu presentation information specifying at least:
  - that the location within the UI is within the first portion of the UI; and
  - an orientation of the touch pen menu that designates a vertical display thereof.

6. The system of claim 1, wherein the one or more selectable menu options comprise a customization option; and
- wherein the processing system is configured, in response to the at least receiving the program code, to:
  - receive, based at least on an interaction of the touch pen with the customization option, a menu customization indication; and
  - display a first sub-menu in the UI responsive to the menu customization indication, the first sub-menu comprising selectable customization options that include at least one of:
    - reordering of the one or more selectable menu options;
    - adding a selectable menu option to the one or more selectable menu options; or
    - removing one of the one or more selectable menu options.

7. A method performed by a computing device, the method comprising:
- receiving a communication from a touch pen that indicates an activation control of the touch pen has been physically activated;
- selecting a touch pen menu from among a plurality of menus based at least on the communication indicating that the activation control of the touch pen has been physically activated, the touch pen menu including one or more selectable menu options corresponding to a respective launching of one or more separate pen applications;
- determining menu presentation information based at least on a state of a user interface (UI) at a time associated with the communication, the menu presentation information specifying at least a location within the UI;
- displaying, via the UI, the touch pen menu according to the menu presentation information, the touch pen menu comprising an interactive handle;
- detecting a drag of the interactive handle across the UI; and
- displaying, via the UI, an expansion of the touch pen menu as a drawer, the drawer including:
  - the one or more selectable menu options in a top row of the drawer, and
  - one or more selectable drawer options below the top row, the one or more selectable menu options in the top row of the drawer corresponding to:
    - a first set of options based at least on a first profile of a user, the first profile being selectable by a first profile UI option displayed in the drawer; or
    - a second set of options based at least on a second profile of the user, the second profile being selectable by a second profile UI option displayed in the drawer.

8. The method of claim 7, wherein the activation control of the touch pen comprises a tail activator; and
- the method further comprises determining the location within the UI based at least on a handedness setting of the state of the UI.

9. The method of claim 7, wherein the computing device comprises a first physical display and a second physical display configured to respectively display a first portion of the UI and a second portion of the UI; and
- wherein the method further comprises determining the location within the UI as being within the first portion of the UI based at least on at least one of:
  - the first portion of the UI corresponding to a handedness setting of the state of the UI; or
  - the state of the UI indicating the first portion of the UI displays a home screen and the second portion of the UI displays an executing application that is in focus.

10. The method of claim 9, comprising:
- receiving, based at least on an interaction of the touch pen with the touch pen menu, a selection indication of a selectable menu option of the one or more selectable menu options that designates a pen application of the one or more separate pen applications; and
- launching the pen application in the first portion of the UI on the first physical display based at least on the location within the UI.

11. The method of claim 7, wherein the one or more selectable menu options comprise a customization option; and
- wherein the method further comprises:
  - receiving, based at least on an interaction of the touch pen with the customization option, a menu customization indication; and
  - displaying a first sub-menu in the UI responsive to the menu customization indication, the first sub-menu comprising selectable customization options that include at least one of:
    - reordering of the one or more selectable menu options;
    - adding a selectable menu option to the one or more selectable menu options; or
    - removing one of the one or more selectable menu options.

12. The method of claim 7, further comprising:
- prior to said displaying, determining at least one of the one or more selectable menu options based at least on one or more of:
  - a pre-determined set of pen applications that are executable by the computing device; or
  - a usage metric associated with one or more pen applications that have been executed by the computing device; and
- associating the one or more selectable menu options with the touch pen menu.

13. The method of claim 7, further comprising:
   detecting a drag gesture of the touch pen across the UI that is indicative of executing a search application;
   executing the search application responsive to said detecting; and
   displaying via the UI:
      a search UI of the executed search application, and
      the one or more selectable menu options in the search UI based at least on the drag gesture being performed with the touch pen.

14. A computer-readable storage medium having program code recorded thereon that, based at least on execution of the program code by a computing device, perform a method, the method comprising:
   receiving a communication from a touch pen that indicates an activation control of the touch pen has been physically activated;
   selecting a touch pen menu from among a plurality of menus based at least on the communication indicating that the activation control of the touch pen has been physically activated, the touch pen menu including one or more selectable menu options corresponding to a respective launching of one or more separate pen applications;
   determining menu presentation information based at least on a state of a user interface (UI) at a time associated with the communication, the menu presentation information specifying at least a location within the UI;
   displaying, via the UI, the touch pen menu according to the menu presentation information, the touch pen menu comprising an interactive handle;
   detecting a drag of the interactive handle across the UI; and
   displaying, via the UI, an expansion of the touch pen menu as a drawer, the drawer including:
      the one or more selectable menu options in a top row of the drawer, and
      one or more selectable drawer options below the top row, the one or more selectable menu options in the top row of the drawer corresponding to:
         a first set of options based at least on a first profile of a user, the first profile being selectable by a first profile UI option displayed in the drawer, or
         a second set of options based at least on a second profile of the user, the second profile being selectable by a second profile UI option displayed in the drawer.

15. The computer-readable storage medium of claim 14, wherein the activation control of the touch pen comprises a tail activator; and
   wherein the method further comprises determining the location within the UI based at least on a handedness setting of the state of the UI.

16. The computer-readable storage medium of claim 14, wherein the computing device comprises a first physical display and a second physical display configured to respectively display a first portion of the UI and a second portion of the UI; and
   wherein the method further comprises determining the location within the UI as being within the first portion of the UI based at least on at least one of:
      the first portion of the UI corresponding to a handedness setting of the state of the UI; or
      the state of the UI indicating the first portion of the UI displays a home screen and the second portion of the UI displays an executing application that is in focus.

17. The computer-readable storage medium of claim 16, wherein the method comprises:
   receiving, based at least on an interaction of the touch pen with the touch pen menu, a selection indication of a selectable menu option of the one or more selectable menu options that designates a pen application of the one or more separate pen applications; and
   launching the pen application in the first portion of the UI on the first physical display based at least on the location within the UI.

18. The computer-readable storage medium of claim 14, wherein the one or more selectable menu options comprise a customization option; and
   wherein the method further comprises:
      receiving, based at least on an interaction of the touch pen with the customization option, a menu customization indication; and
      displaying a first sub-menu in the UI responsive to the menu customization indication, the first sub-menu comprising selectable customization options that include at least one of:
         reordering of the one or more selectable menu options;
         adding a selectable menu option to the one or more selectable menu options; or
         removing one of the one or more selectable menu options.

19. The computer-readable storage medium of claim 14, wherein the method further comprises:
   prior to said displaying, determining at least one of the one or more selectable menu options based at least on one or more of:
      a pre-determined set of pen applications that are executable by the computing device; or
      a usage metric associated with one or more pen applications that have been executed by the computing device; and
   associating the one or more selectable menu options with the touch pen menu.

20. The computer-readable storage medium of claim 14, wherein the method further comprises:
   detecting a drag gesture of the touch pen across the UI that is indicative of executing a search application;
   executing the search application responsive to said detecting; and
   displaying via the UI:
      a search UI of the executed search application, and
      the one or more selectable menu options in the search UI based at least on the drag gesture being performed with the touch pen.

* * * * *